US008256253B2

(12) United States Patent
Chen et al.

(10) Patent No.: US 8,256,253 B2
(45) Date of Patent: Sep. 4, 2012

(54) CYLINDRICAL LOCK

(75) Inventors: Po-Yang Chen, Chiayi (TW); Tsung-Chung Huang, Minxiong Township, Chiayi County (TW); Ju-Lin Yang, Minxiong Township, Chiayi County (TW); Yu-Ting Huang, Chiayi (TW); Chia-Min Sun, Chiayi (TW)

(73) Assignee: Tong Lung Metal Industry Co., Ltd., Chiayi (TW)

( * ) Notice: Subject to any disclaimer, the term of this patent is extended or adjusted under 35 U.S.C. 154(b) by 1 day.

(21) Appl. No.: 13/186,449

(22) Filed: Jul. 19, 2011

(65) Prior Publication Data

US 2012/0017657 A1 Jan. 26, 2012

(30) Foreign Application Priority Data

Jul. 22, 2010 (TW) ............................... 99213941 U
Jul. 22, 2010 (TW) ............................... 99213942 U

(51) Int. Cl.

| | |
|---|---|
| ***B60R 25/02*** | (2006.01) |
| ***B62H 5/04*** | (2006.01) |
| ***E05B 13/10*** | (2006.01) |
| ***F16C 3/00*** | (2006.01) |
| ***G05G 5/00*** | (2006.01) |

(52) U.S. Cl. ............. 70/224; 70/379 R; 70/380; 70/221; 70/222; 70/223; 70/472

(58) Field of Classification Search ................ 70/379 R, 70/380, 221–224, 472
See application file for complete search history.

(56) References Cited

U.S. PATENT DOCUMENTS

| | | | | |
|---|---|---|---|---|
| 5,794,472 | A * | 8/1998 | Kester et al. | 70/224 |
| 6,279,360 | B1 * | 8/2001 | Shen | 70/224 |
| 6,357,270 | B1 * | 3/2002 | Vazquez | 70/224 |
| 7,870,772 | B1 * | 1/2011 | Guo et al. | 70/224 |
| 8,051,689 | B1 * | 11/2011 | Shen et al. | 70/224 |
| 2006/0169012 | A1 * | 8/2006 | Liu et al. | 70/224 |

* cited by examiner

*Primary Examiner* — Suzanne Barrett
*Assistant Examiner* — David E Sosnowski
(74) *Attorney, Agent, or Firm* — Chun-Ming Shih

(57) ABSTRACT

A kind of cylindrical lock, this lock able to be installed on a door, includes: one transmission structure which can operate a drive base, this drive base gearing a latch mechanism; this latch mechanism having: one tubular shaped element, which can be coupled to a handle for actuation; a tube, which can be rotated and inserted into the tubular shaped element; one pushing part, having one side with at least one pushing section, this pushing section able to push the drive base at the appropriate time; a collar, which can be set on one end of the tubular shaped element, a meshing section formed on one end of the collar; an engaging element, partly installed in this pushing part, one meshing section formed on this engaging element, and this engaging element having at least one pushable section; one rotating part, having at least one pushing portion, each pushing portion at the appropriate time pushing the adjacent pushable section of the engaging element; one lock set, having a lock core linked to one transmission part; rotating this lock core to move from the beginning position at an angled position in a predetermined direction back to the beginning position, the transmission part of this lock set can push a moving part, causing this engaging element to do axial displacement, and causing the meshing section of the engaging element to be positioned and move between the incompatible meshing of the first position or compatible meshing of the second position, on the meshing section of this collar.

13 Claims, 17 Drawing Sheets

CYLINDRICAL LOCK

BACKGROUND OF THE INVENTION

1, Field of the Invention

The invention relates to a cylindrical lock, more particularly to a channel lock which can be applied to a lock having a button on one side and a lock set on the other side. Moreover, the correct key needs to rotate the lock core to move from the beginning position at an angled position in a predetermined direction back to the beginning position, so as to control the unlocking or locking operation.

2, Description of Related Art

With the current structure of cylindrical locks, the main design is concerned with the handles on the two sides, the cover plate sets on the two sides and the design of the internal transmission structure, moreover regarding this transmission structure, the main part is the link between the internal and external driving tubes and the contracting mechanism, the latch mechanism combination, fitting with the lock set and the button lever to achieve an opening and closing operation of the whole lock, the transmission structure of this lock, is a contracting mechanism placed in an accommodating space, this contracting mechanism can accept the pushing section and pushing of the internal driving tube, the external driving tube and external tube, allowing for operation and movement of the connected latch mechanism of the contracting mechanism. When the button lever of the internal driving tube is in the closed position, or when the lock set of the external driving tube is in the closed position, the lock lever restricts the retraction movement of the latch mechanism of the contracting mechanism by the external driving tube, and when the lock status is changed, as when unlocking, the button lever doesn't restrict the retraction movement of the latch mechanism of the contracting mechanism by the external driving tube, thus when rotating the internal driving tube, the external driving tube or external tube, because of the pushing section driving movement of the contracting mechanism in the accommodating space, and the simultaneous driving movement of the latch bolt of the latch mechanism in the direction of the accommodating space, an open status is attained, as such the whole construction of the previously disclosed cylindrical lock structures can be regarded as the structure most commonly found, but because the places and environments are all different, many different functions are extended by the different requirements of the lock uses.

SUMMARY OF THE INVENTION

In view of this, the main purpose of the present invention is to provide a cylindrical lock which can be applied to a channel lock. The correct key needs to rotate the lock core to move from the beginning position at an angled position in a predetermined direction back to the beginning position, so as to control the unlocking or locking operation, or to press the button for locking operation and to rotate the second handle for unlocking operation.

In order to achieve the above goal, a cylindrical lock of the present invention, which is installed on a door, includes: one transmission structure which can operate a drive base, this drive base gearing a latch mechanism; this transmission structure having: one tubular shaped element, which can be driven by a handle; a tube, which can be rotated and inserted into the tubular shaped element; one pushing part having one side with at least one pushing section, this pushing section able to push the drive base at the appropriate time; a collar, which can be set on one end of the tubular shaped element, a meshing section formed on one end of the collar; an engaging element, partly installed in this pushing part, one meshing section formed on this engaging element, and this engaging element having at least one pushable section; one rotating part, having at least one pushing portion, each pushing portion at the appropriate time pushing the adjacent pushable section of the engaging element; one lock set, having a lock core linked to one transmission part; rotating this lock core to move from the beginning position at an angled position in a predetermined direction back to the beginning position, the transmission part of this lock set can push a moving part, causing this engaging element to do axial displacement, and causing the meshing section of the engaging element to be positioned and move between the incompatible meshing of the first position or compatible meshing of the second position, on the meshing section of this collar.

The invention, as well as its many advantages, may be further understood by the following detailed description and drawings in which:

DETAILED DESCRIPTION OF THE INVENTION

Figure 1:
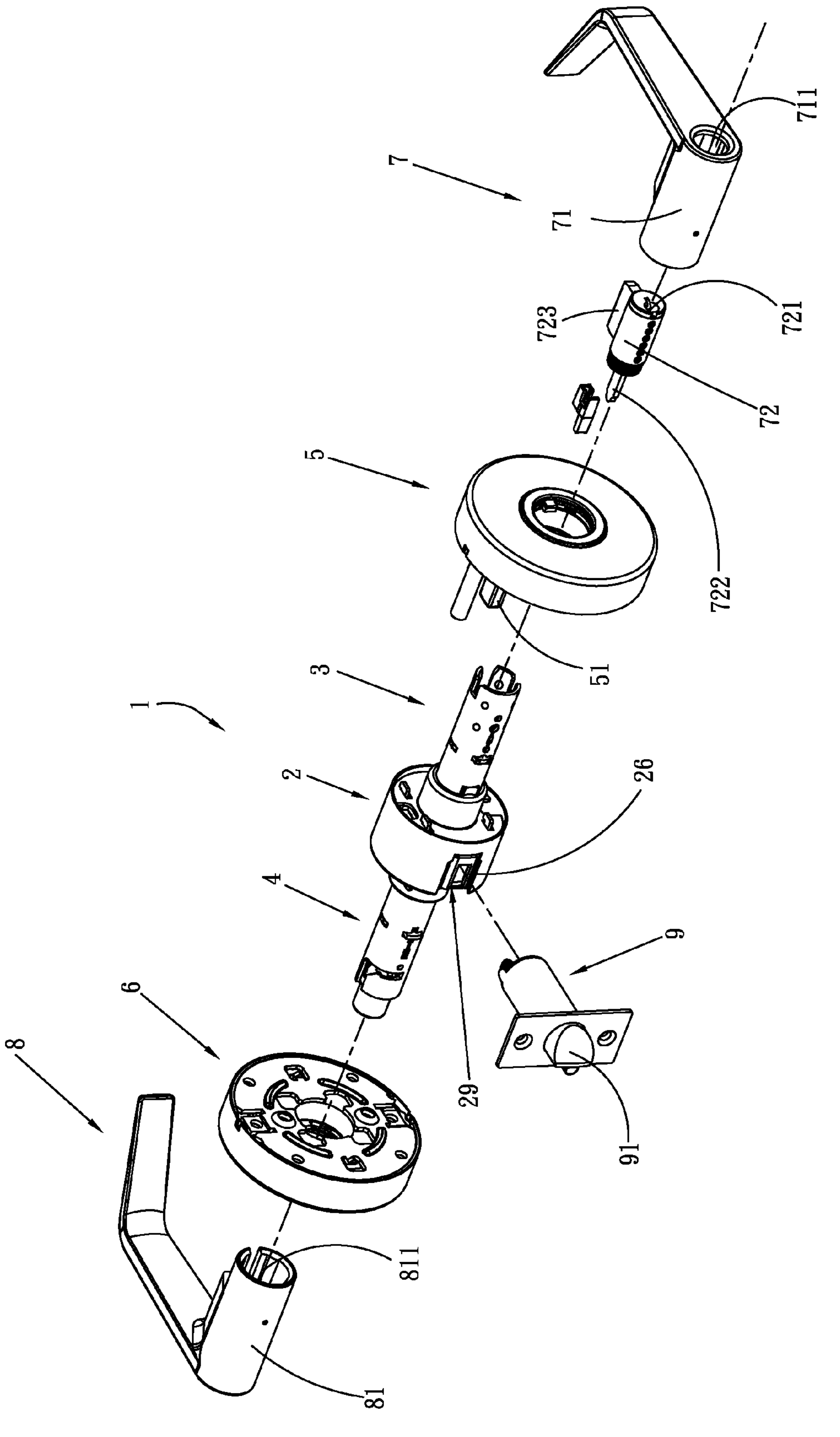
FIG. 1 is a perspective exploded diagram showing the overall lock structure and a latch mechanism of the first preferred embodiment of the present invention.

As shown in FIG. 1, which is a kind of cylindrical lock of the first preferred embodiment of the present invention, the lock is able to be installed on a door (not shown in the figure), including a transmission structure 1 capable of operating a drive base 26 and driving a latch mechanism 9 of the drive base 26. Please refer to FIG. 1~FIG 4, the transmission structure 1 able to arrange in a group with a first cover plate set 5, a second cover plate set 6, a first handle set 7 and a second handle set 8 of the lock (or other handle mechanisms) for being installed on the door (not shown in the figure); the transmission structure 1 including: a housing 2, a contracting mechanism 29, a first transmission structure 3 and a second transmission structure 4.

The first handle set 7 includes a first handle 71 and a lock set 72.

The first handle 71 has a through hole 711, the lock set 72 able to be set in the through hole 711 of the first handle 71, the lock set 72 having a lock core 721 (as shown in FIG. 1) connecting to a transmission part 722 so as to link to, and move the first transmission structure 3.

The second handle set 8 includes: a second handle 81 having a through hole 811.

Figure 2:
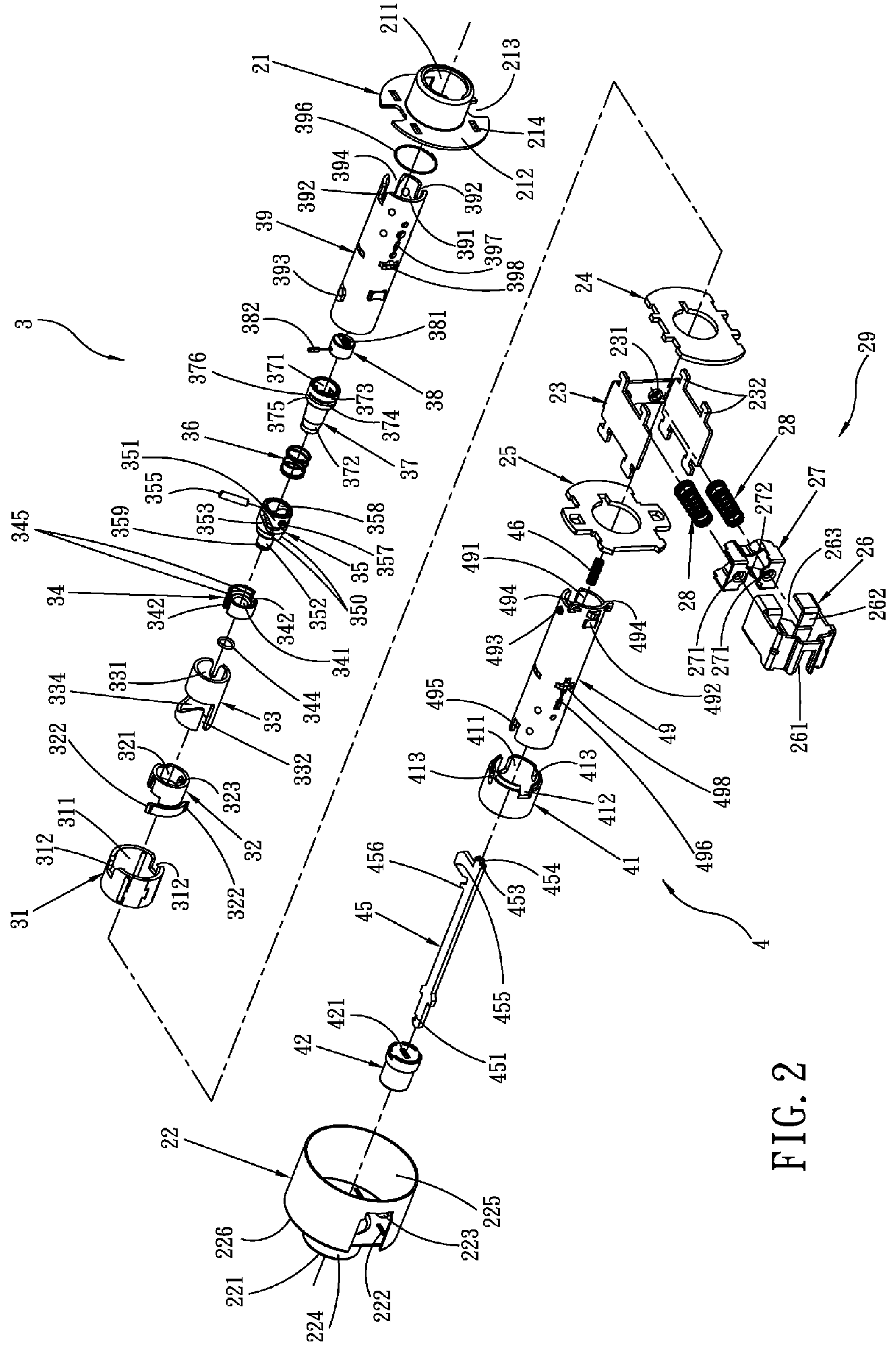
FIG. 2 is a perspective exploded diagram showing every component of the lock transmission structure of the first preferred embodiment of the present invention.

As shown in FIG. 1 and FIG. 2, the contracting mechanism 29 can be installed inside the housing 2, including:

One end of the drive base 26 has a moving section 261, and able to be connected to the interior drive element of the latch mechanism 9 so as to pull the latch bolt 91 of the latch mechanism 9, the other end of the drive base 26 having an accommodating part 263, a support part 262 located between the moving section 261 and the accommodating part 263.

A positioning element 27 is an L-shaped plate body, having two separate positioning points 271 and one resisting part 272, the positioning element 27 able to be installed in the accommodating part 263 of the drive base 26.

Two springs 28 respectively installed between two positioning points 271 of the positioning element 27 and two positioning points 231 of a base 23 so as to partially press the drive base 26.

Figure 3:
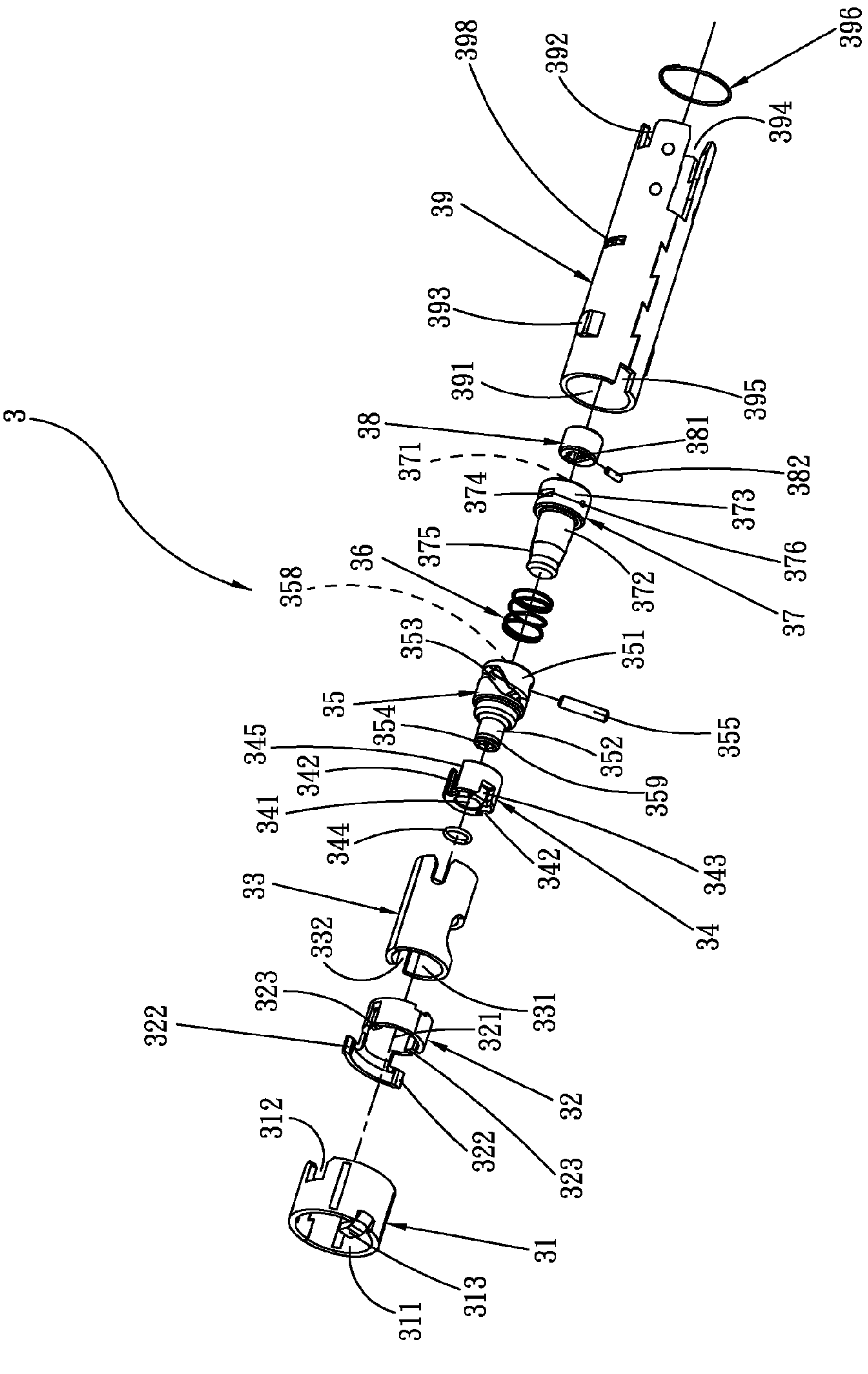
FIG. 3 is a perspective exploded diagram showing the first transmission structure of the first preferred embodiment of the present invention.
Figure 4:
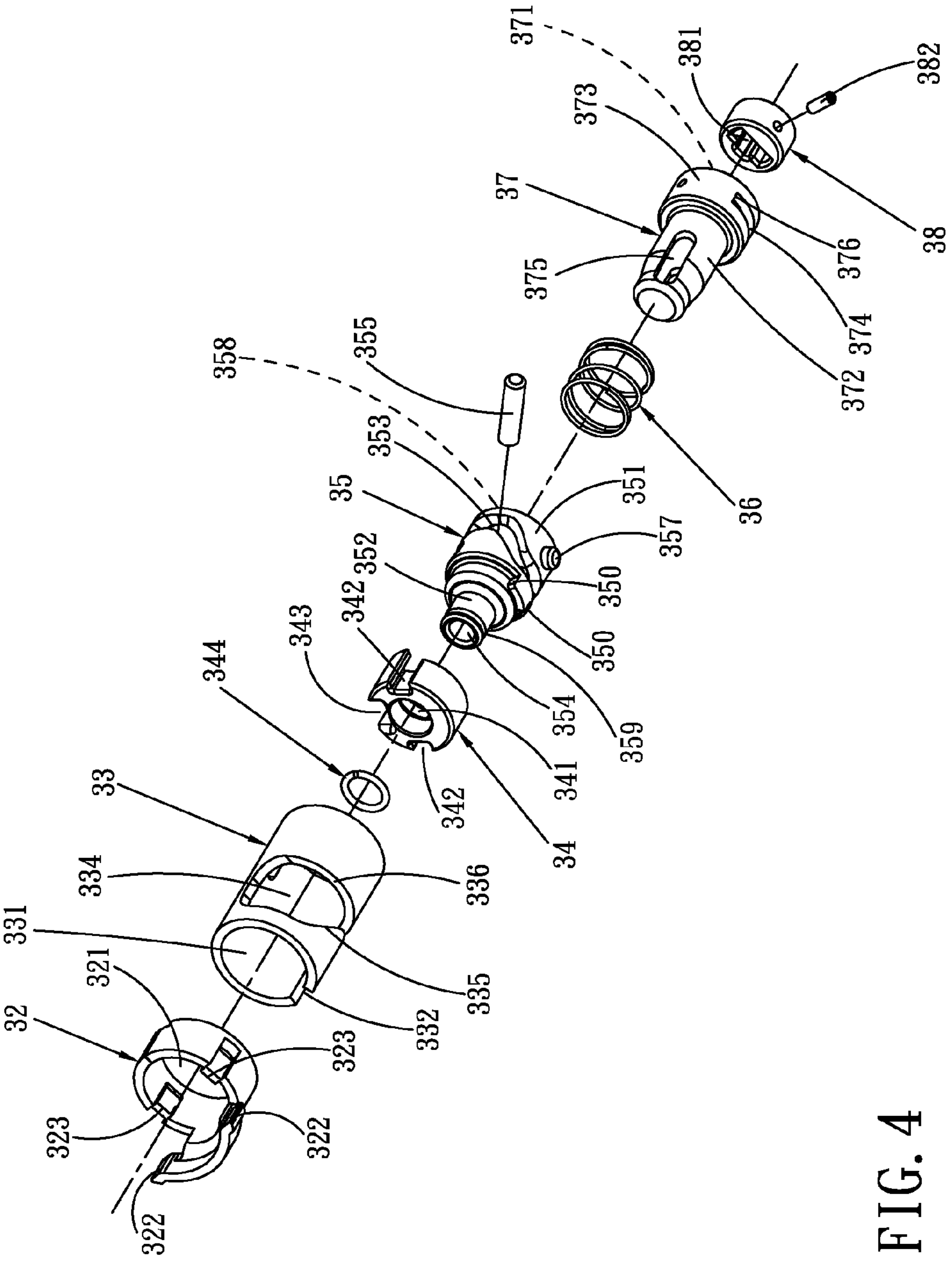
FIG. 4 is a perspective exploded diagram showing a pushing part, a tube, a circlip, an engaging part, a rotating part, a pin, a spring, an axial shaft, and a moving part of the first preferred embodiment of the present invention.
Figure 6:
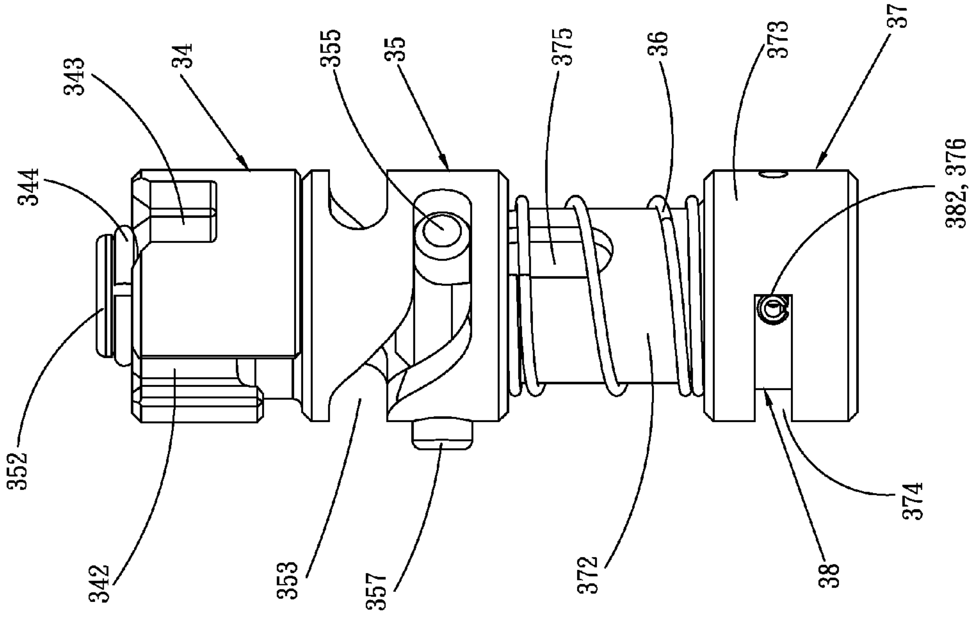
FIG. 6 is a plane diagram showing an engaging part situated at the second position after combining a moving part, an axial shaft, a rotating part, an engaging part, a pin and a spring, of the first preferred embodiment of the present invention.
Figure 5:
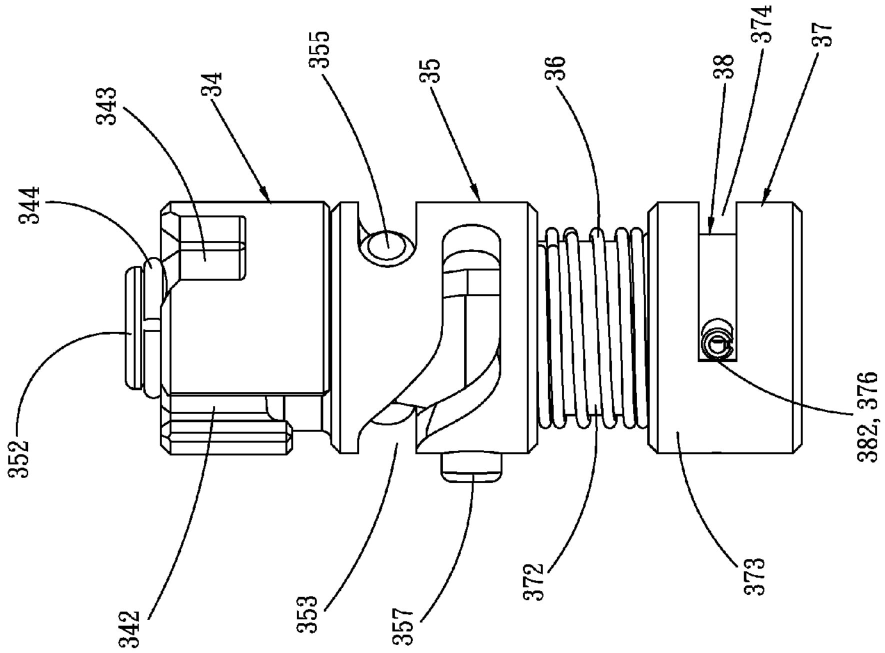
FIG. 5 is a plane diagram showing an engaging part situated at the first position after combining a moving part, an axial shaft, a rotating part, an engaging part, a pin and a spring, of the first preferred embodiment of the present invention.

As shown in FIG. 2 to FIG. 4, the mentioned first transmission structure 3 includes:

A tube 33 which is a tubular shaped element, has a center hole 331, the tube wall having a long groove 332 and an accommodating groove 334, the long groove 332 connected to the accommodating groove 334, a chamfer 335 and a transverse edge 336 formed around the accommodating groove 334.

An axial shaft 37 can be installed in the center hole 331 of the tube 33, with one side of the axial shaft 37 having a flange 373, the other side having an axle 372, an accommodating space 371 formed on the axis of the flange 373, an arc-shaped groove 374 formed on the flange 373, and two separate pushable parts 376 formed around the arc-shaped groove 374. (only one shown in FIG. 2, FIG. 3 and FIG. 4)

One end of rotating part 35 having an axle 352, the other end having a flange 351, a first hole 354 connected to a second hole 358 in the axial direction of the rotating part 35, the axle 372 of the axial shaft 37 able to be placed inside the second hole 358, a spiral groove 353 and a convex part 357 formed separately on the flange 351 of rotating part 35, the convex part 357 able to insert into the long groove 332 of the tube 33 and move into the long groove 332 and the accommodating groove 334 at the appropriate time, the axle 352 of the rotating part 35 having a retaining ring groove 359 and two pushing portions 350 formed separately. A circlip 344 is fastened to the retaining ring groove 359.

A pushing part 32 having one side with two separate pushing sections 322, the pushing sections 322 able to push the drive base 26 at the appropriate time; at least one convex part 323 formed on the interior side of the tube wall of the pushing part 32.

An engaging element 34 has a hole 341 in the axial direction, which can allow for axle 352 of the rotating part 35 to be set inside, the engaging element 34 partially installed in the center hole 321 of the pushing part 32, a meshing section 343 and two separate grooves 342 formed on the engaging element 34, at least one pushable section 345 formed along the engaging element 34, the pushable section 345 of the engaging element 34 able to be pushed by the pushing portion 350 of the rotating part 35 at the appropriate time; two separate grooves 342 of the engaging element 34 can be set separately set on the two convex parts 323 of the pushing part 32 so as to maintain an axial motion of the engaging element 34.

A pin 355 can be set through the spiral groove 353 of the rotating part 35 and the through hole 375 of the axial shaft 37.

A spring 36 can be axially set on the axle 372 of the axial shaft 37 so as to partially press the pin 355, the rotating part 35 and the engaging part 34.

A moving part 38 can be placed in the accommodating space 371 of the axial shaft 37, a through hole 381 is formed at the center of the moving part 38 and at least one moving element 382 formed around the moving part 38 (which can also be connected to the moving part 38 by using a pin 382), the moving element 382 of the moving part 38 able to be set through the arc-shaped groove 374 of the axial shaft 37, thereby after making the moving element 382 of the moving part 38 rotate at an angled position in a predetermined direction, the moving element 382 of the moving part 38 is able to push the pushable part 376 of the axial shaft 37 appropriately.

A tubular shaped element 39 has a center hole 391, which accepts the insertion of the tube 33 and partial pushing part 32, a ring 396 set on the exterior tube wall of the tubular shaped element 39 to increase the strength, one end of the tubular shaped element 39 having two separate convex parts 393 (only one shown in FIG. 2) and an indentation 395 (only shown in FIG. 3) on the exterior tube wall, the other end having two separate grooves 392 able to mesh with the first handle 71, an installation channel 394 able to mesh with the convex part 723 of the lock set 72 and the first handle 71 (shown in FIG. 1), a positioning plate 398 able to be installed and move in the central tube wall of the tubular shaped element 39 and able to accept partial pressure from the elastic element 397 and which is movable between the position partly extending out of the tube wall and the meshing of the first handle 71 or retracting inside the tube wall and moving away from the first handle 71, which won't be repeated again here due to its conventional structure.

A collar 31 has a center hole 311, able to be set on the tubular shaped element 39, one end of the collar 31 having a meshing section 313 (only shown in FIG. 3) able to partially mesh with the indentation 395 of the tubular shaped element 39; the other end having two separate notches 312 able to respectively mesh with two convex parts 393 of the tubular shaped element 39 so as to increase the strength and torsional strength of the tubular shaped element 39.

Figure 7:
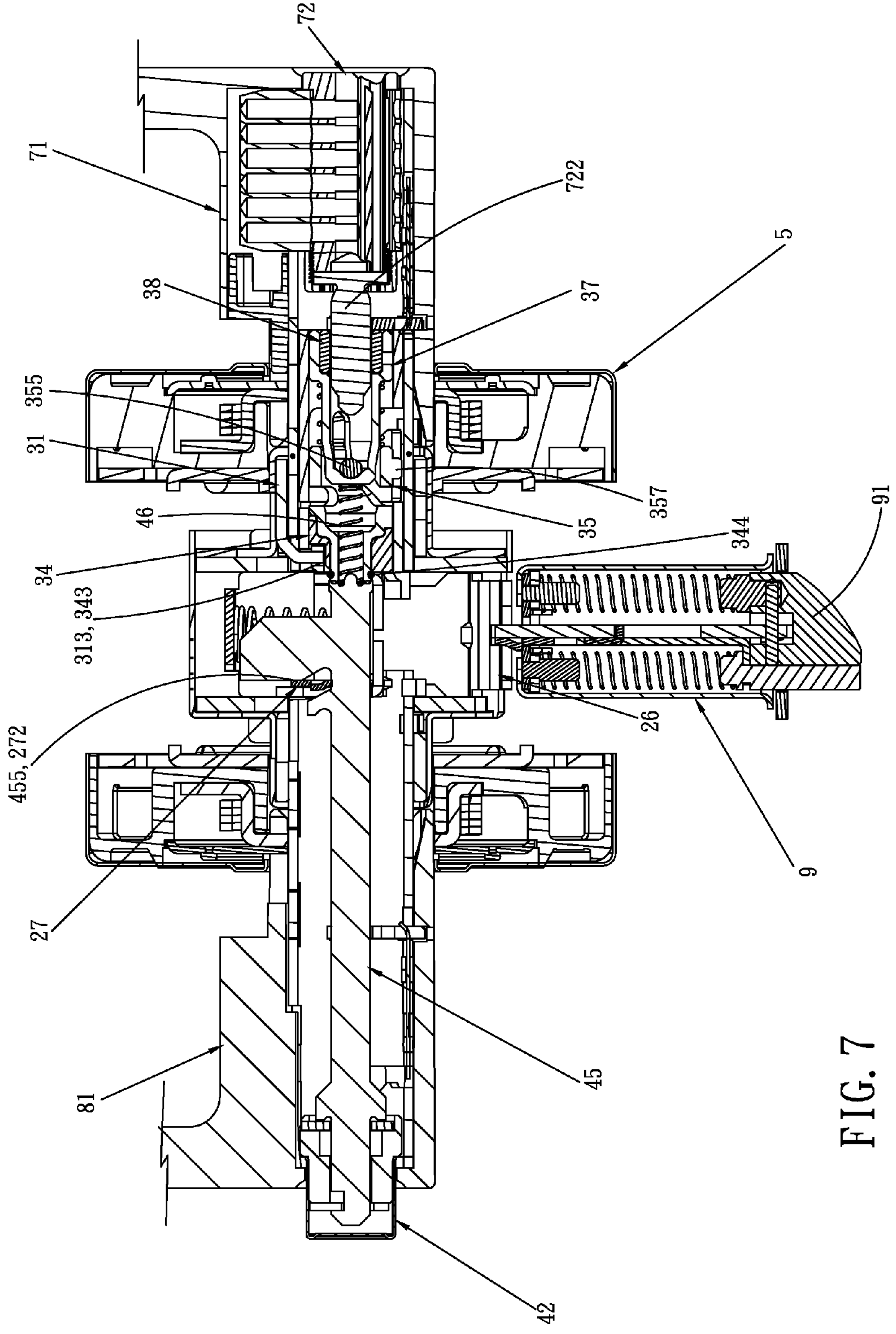
FIG. 7 is a sectional diagram showing the first stopping part of the rod member adjacent to the resisting part of the positioning element, and the meshing section of the engaging element and the meshing section of the collar to be positioned on the compatible meshing of the second position in the overall lock structure of the first preferred embodiment of the present invention.

As shown in FIG. 2 and FIG. 7, the mentioned second transmission structure 4 includes:

A driving tube 49 has a center hole 491, one end having two separate pushing sections 494 adjacent to the support part 262 of the drive base 26, able to directly drive the drive base 26, the other end of the driving tube 49 having two separate grooves 495 set with an interval and an installation channel (not shown in the figure), able to mesh with the second handle 81, the driving tube 49 having a projection 492 projecting out from the tube wall and two separate convex parts 493 around the vicinity of the pushing section 494, a positioning plate 498 able to be installed and move in the central tube wall of the driving tube 49, able to accept a partial pressure from the elastic element 496, which is movable between the position partly extending out of the tube wall and the meshing of the second handle 81 or retracting inside the tube wall and moving away from the second handle 81, which won't be repeated again here due to its conventional structure.

A strengthening ring 41 having a center hole 411, able to set on the driving tube 49, strengthening ring 41 having a notch 412 and two separate grooves 413, the notch 412 of the strengthening ring 41 able to mesh with projection 492 of the driving tube 49; two grooves 413 of the strengthening ring 41 able to respectively mesh with two convex parts 493 of the driving tube 49 so as to increase the strength and the torque of the driving tube 49.

A rod member 45 is a plate shaped part, one end having a connecting part 451, the other end of the rod member 45 having a support part 454 and a pushing portion 453, and the side of rod member 45 having a first stopping part 455 and a second stopping part 456.

A button 42 has a hole 421 able to mesh with the connecting part 451 of the rod member 45.

A spring 46 can be set in the first hole 354 of the rotating part 35, one end supporting the end of the axle 372 of the axial shaft 37, the other end supporting the support part 454 of the rod member 45 so as to partially press the rod member 45.

As shown in FIG. 1 and FIG. 2, the housing 2 is formed by connecting a base 23, a first cover plate 24, a second cover plate 25, a sleeve 21 and a cylindrical housing 22.

A sleeve 21 is a hollow tubular shape and has a center hole 211 which can allow tubular shaped element 39 to pass through, one end having a flange 212, the flange 212 having two separate notches 213 and four separate holes 214, the holes 214 allowing the hook 232 of the base 23 to pass through, thereafter bending the hook 232, and able to fix the sleeve 21 on one side of the base 23.

A cylindrical housing 22 which is a tubular shape, one end having an opening 225, the other end having a bottom 226 for a horizontal setting, the bottom 226 connected to a cylinder 224, a center hole 221 formed on the cylinder 224, and the bottom 226 having four separate holes 222 set at intervals (only two shown in the figure) and two separate through holes 223 (only one shown in the figure).

The driving tube 49 able to be inserted in center hole 221, the cylindrical housing 22 able to be set directly on the base 23 so as to allow the hook 232 of the base 23 be inserted into hole 222 of the cylindrical housing 22, thereafter bending the hook 232, and fixing the cylindrical housing 22 on the other side of the base 23, at this moment, each of the through holes 223 can respectively match each pillar 51 of the first cover plate set 5, and are connected to each other by screws (not shown in the figure).

Figure 8:
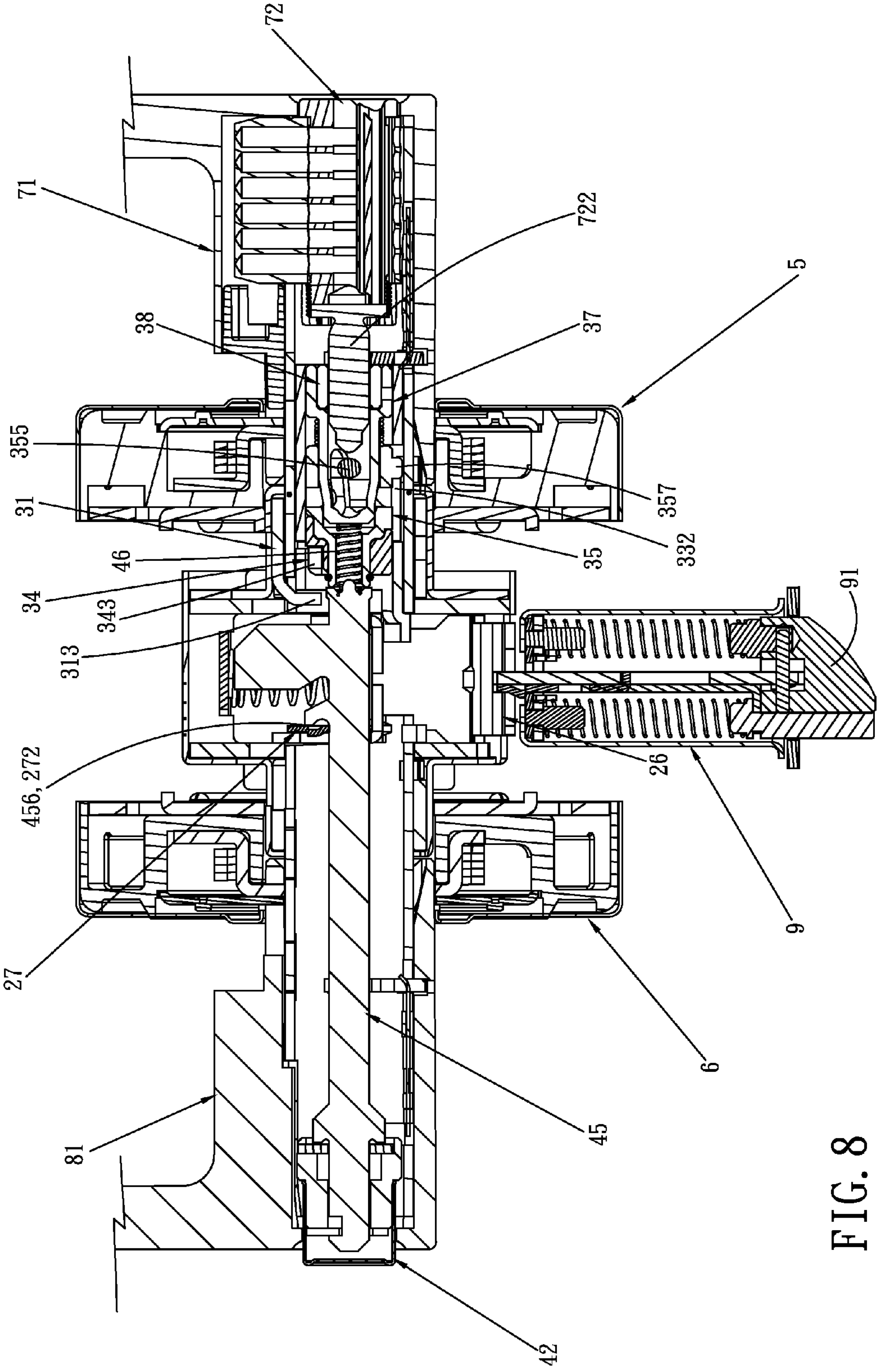
FIG. 8 is a sectional diagram showing the second stopping part of the rod member adjacent to the resisting part of the positioning element, and the meshing section of the engaging element and the meshing section of the collar to be positioned on the incompatible meshing of the first position in the overall lock structure of the first preferred embodiment of the present invention.

As shown in FIG. 1, FIG. 2, FIG. 7 and FIG. 8, the button 42 can control the locking operation of the lock but is unable to control unlocking. When trying to unlock, the second handle 81 needs to be turned. The locking operation of the second handle set 8 is to press the button 42, which pushes the rod member 45, and thereby the second stopping part 456 of the rod member 45 is moved adjacent to the resisting part 272 of the positioning element 27 (as shown in FIG. 8).

At the same time, the pushing portion 453 of the rod member 45 can push the engaging element 34 and the rotating part 35 to do axial displacement corresponding to the axial shaft 37 (because the pin 355 inserted through the rotating part 35 can move axially in the axial through hole 375 of the axial shaft 37), thus the axial movement of the engaging element 34 causes the meshing section 343 of the engaging element 34 to move from the meshed second position of the meshing section 313 of the collar 31 (as shown in FIG. 7) to the disengaged first position of the meshing section 313 of the collar 31 (as shown in FIG. 8). Therefore, rotating the first handle 71 will link to, and move the tubular shaped element 39 and generate an idle rotation at a predetermined angle, resulting in an outside locked status.

As shown in FIG. 2, FIG. 7 and FIG. 8, when trying to open the door from the interior of the lock, the second handle 81 can be turned, driving the pushing section 494 of the driving tube 49 to move the drive base 26. At the same time, because the positioning element 27 of the accommodating part 263 placed in the drive base 26 is pushed by the drive base 26, causing the resisting part 272 of the positioning element 27 separated from the second stopping part 456 of the rod member 45. The rod member 45 is pushed by the partial pressure of the spring 46, thereby the first stopping part 455 of the rod member 45 is moved adjacent to the resisting part 272 of the positioning element 27 (as shown in FIG. 7), so the second handle 81 able to unlock and open the door.

Figure 9:
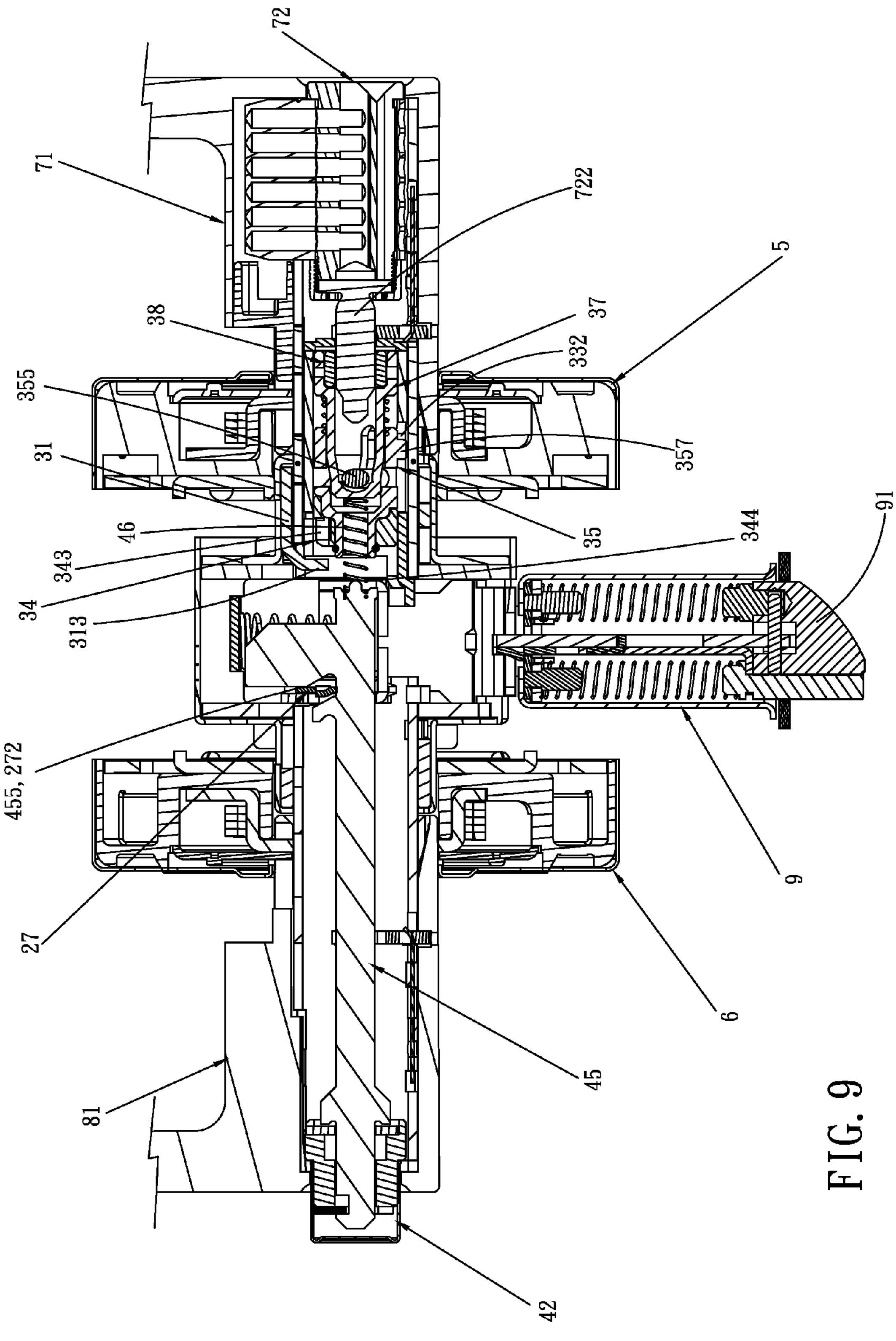
FIG. 9 is a sectional diagram showing the first stopping part of the rod member adjacent to the resisting part of the positioning element, and the meshing section of the engaging element and the meshing section of the collar to be positioned on the incompatible meshing of the first position in the overall lock structure of the first preferred embodiment of the present invention.

As shown in FIG. 2, FIG. 7 and FIG. 9, when trying to operate the lock to be locked from the lock set 72 of the first handle set 7, a right key (not shown in the figure) is needed to operate the lock set 72 to rotate the lock core 721 to move from the beginning position at an angled position in a predetermined direction back to the beginning position.

At this moment, the transmission part 722 of the lock set 72 will push the moving part 38 to rotate idly at an angle, because in normal mode, the moving element 382 of the moving part 38 will be situated at the middle position of the arc-shaped groove 374 of the axial shaft 37, which causes the moving element 382 of the moving part 38 to push the pushable part 376 of the axial shaft 37 so as to rotate the axial shaft 37.

Because two spiral grooves 353 of the rotating part 35 match the through holes 375 of the axial shaft 37 and a pin 355 is connected there between, when the axial shaft 37 rotates, the rotating part 35 will move corresponding to the axial displacement distance generated by axial shaft 37, thereby pushing the engaging element 34 to generate axial displacement, causing the meshing section 343 of the engaging element 34 to move from the meshed second position of the meshing section 313 of the collar 31 (as shown in FIG. 7) to the disengaged first position of the meshing section 313 of the collar 31 (as shown in FIG. 9).

Therefore, rotating the first handle 71 will link to, and move the tubular shaped element 39 and generate an idle rotation at a predetermined angle, which cannot move the pushing part 32, thereby resulting in an outside locked status.

As shown in FIG. 1, FIG. 2, FIG. 7 and FIG. 9, when trying to operate the lock to be unlocked from the lock set 72 of the first handle set 7, a correct key (not shown in the figure) is needed to operate the lock set 72 to rotate the lock core 721 to move from the beginning position at an angled position about 360 degrees in a predetermined direction back to the beginning position.

At this moment, the transmission part 722 of the lock set 72 will push the moving part 38 to rotate idly at an angle, because in normal mode the moving element 382 of the moving part 38 will be situated in the middle position of the arc-shaped groove 374 of the axial shaft 37, which causes the moving element 382 of the moving part 38 to push the pushable part 376 of the axial shaft 37 so as to rotate the axial shaft 37.

Because two spiral grooves 353 of the rotating part 35 match the through holes 375 of the axial shaft 37 and a pin 355 connects them, when the axial shaft 37 rotates, the rotating part 35 will move corresponding to the axial displacement distance generated by axial shaft 37, thereby pushing the engaging element 34 to do axial displacement, causing the meshing section 343 of the engaging element 34 to move from the disengaged first position of the meshing section 313 of the collar 31 (as shown in FIG. 9) to the meshed second position of the meshing section 313 of the collar 31 (as shown in FIG. 7).

Therefore, when rotating the first handle 71, it links to, and moves the tubular shaped element 39 and the collar 31, because the meshing section 313 of the collar 31 meshes with the meshing section 343 of the engaging element 34, and the groove 342 of the engaging element 34 is set on the convex part 323 of the pushing part 32, thereby moving the pushing section 322 of the pushing part 32 to drive the support part 262 of the drive base 26, causing the drive base 26 to pull the interior driving element of the latch mechanism 9 to retract the latch bolt 91, thereby allowing for the door to be opened.

As shown in FIG. 1, FIG. 2, FIG. 4, FIG. 8 and FIG. 9, when trying to operate the lock button 42 to be unlocked from the lock set 72 of the first handle set 7, a correct key (not shown in the figure) is needed to operate the lock set 72 to rotate the lock core 721 to move from the beginning position at an angled position about 360 degrees in a predetermined direction back to the beginning position. At this moment, the transmission part 722 of the lock set 72 will push the moving part 38 to rotate idly at an angle, because in normal mode, the moving element 382 of the moving part 38 will be situated at the middle position of the arc-shaped groove 374 of the axial shaft 37, which causes the moving element 382 of the moving part 38 to push the pushable part 376 of the axial shaft 37 so as to rotate the axial shaft 37.

Because two spiral grooves 353 of the rotating part 35 match the through holes 375 of the axial shaft 37 and a pin 355 connects them, when the axial shaft 37 rotates, because the accommodating groove 334 of the tube 33 can accommodate the convex part 357 of the rotating part 35, the rotating part 35 will rotate at a predetermined angle according to the axial shaft 37, that is, the convex part 357 of the rotating part 35 will move along the transverse edge 336 of the tube 33 from the long groove 332 of the tube 33.

After one of the pushing portions 350 of the rotating part 35 moves adjacent to one of the pushable section 345 of the engaging element 34, the pushing portions 350 of the rotating part 35 can move the pushable section 345 of the engaging element 34 to rotate at a predetermined angle, causing the engaging element 34 to move the pushing part 32, thereby the pushing section 322 of the pushing part 32 pushes the drive base 26 so as to make the drive base 26 retract.

At this moment, the resisting part 272 of the positioning element 27 will separate from the second stopping part 456 of the rod member 45. The support part 454 of the rod member 45 is partially pressed by the spring 46, which makes the first stopping part 455 of the rod member 45 adjoin the resisting part 272 of the positioning element 27. Because the engaging element 34 is not partially pressed, the engaging element 34, the rotating part 35 and the pin 355 will be partially pressed by the spring 36, thereby pushing the engaging element 34 to do axial displacement, causing the meshing section 343 of the engaging element 34 to move from the disengaged first position of the meshing section 313 of the collar 31 (as shown in FIG. 8) to the meshed second position of the meshing section 313 of the collar 31 (as shown in FIG. 7). When the above mentioned drive base 26 retracts, the drive base 26 can pull the interior driving element of the latch mechanism 9 to retract the latch bolt 91, thereby allowing for the door to be opened.

Figure 10:
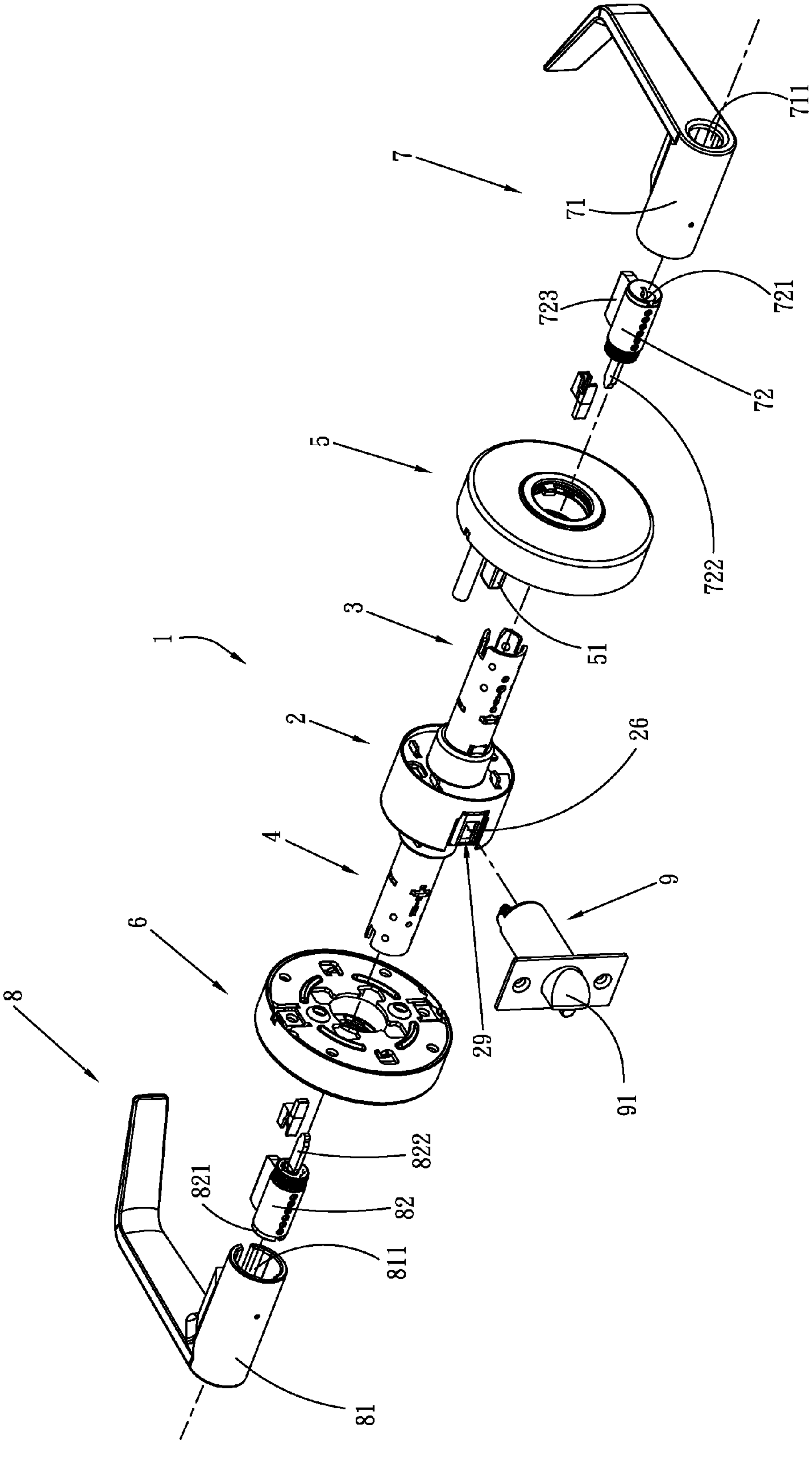
FIG. 10 is a perspective exploded diagram showing the whole lock structure and the latch mechanism of the second preferred embodiment of the present invention.

As shown in FIG. 10, which is a kind of cylindrical lock of the second preferred embodiment of the present invention, the lock is able to be installed on a door (not shown in the figure), including a transmission structure 1 capable of operating a drive base 26 and driving a latch mechanism 9 of the drive base 26. Please refer to FIG. 10~FIG. 13, the transmission structure 1 can be matched to a first cover plate set 5, a second cover plate set 6, a first handle set 7 and a second handle set 8 of the lock (or other similar mechanisms) for being installed on the door (not shown in the figure); the transmission structure 1 including: a housing 2, a contracting mechanism 29, a first transmission structure 3 and a second transmission structure 4.

The first handle set 7 includes a first handle 71 and a lock set 72.

The first handle 71 has a through hole 711, the lock set 72 able to be set in the through hole 711 of the first handle 71, the lock set 72 having a lock core 721 (shown in FIG. 10) connecting to a transmission part 722 so as to link to, and move a first transmission structure 3.

The second handle set 8 includes a second handle 81 and a lock set 82.

The second handle 81 has a through hole 811, the lock set 82 able to be set in the through hole 811 of the second handle 81, the lock set 82 having a lock core 821 (as shown in FIG. 10) which connects to a transmission part 822 so as to link to, and move a second transmission structure 4.

Figure 11:
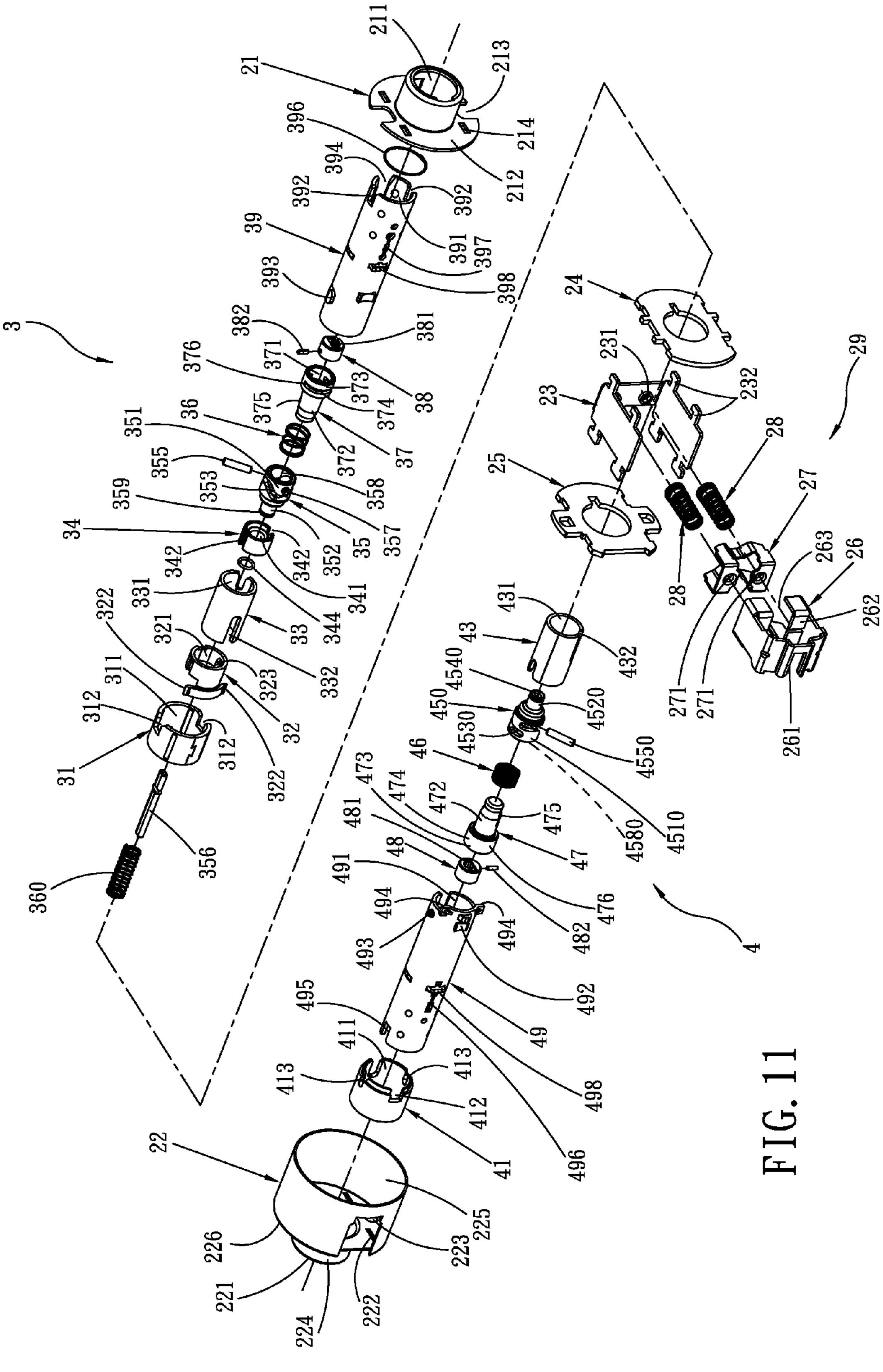
FIG. 11 is a perspective exploded diagram showing every component of the lock transmission structure of the second preferred embodiment of the present invention.

As shown in FIG. 10 and FIG. 11, the contracting mechanism 29 can be installed inside the housing 2, includes:

One end of the drive base 26 having a moving element 261, and which can be connected to the interior drive element (not shown in the figure) of the latch mechanism 9 so as to pull the latch bolt 91 of the latch mechanism 9, the other end of the drive base 26 having an accommodating part 263, and a support part 262 located between the moving element 261 and the accommodating part 263.

A positioning element 27 is an L-shaped plate body, having two separate positioning points 271, the positioning element 27 able to be installed in the accommodating part 263 of the drive base 26.

Two springs 28 installed between a positioning point 271 of the positioning element 27 and a positioning point 231 of a base 23 so as to partially press the drive base 26.

Figure 12:
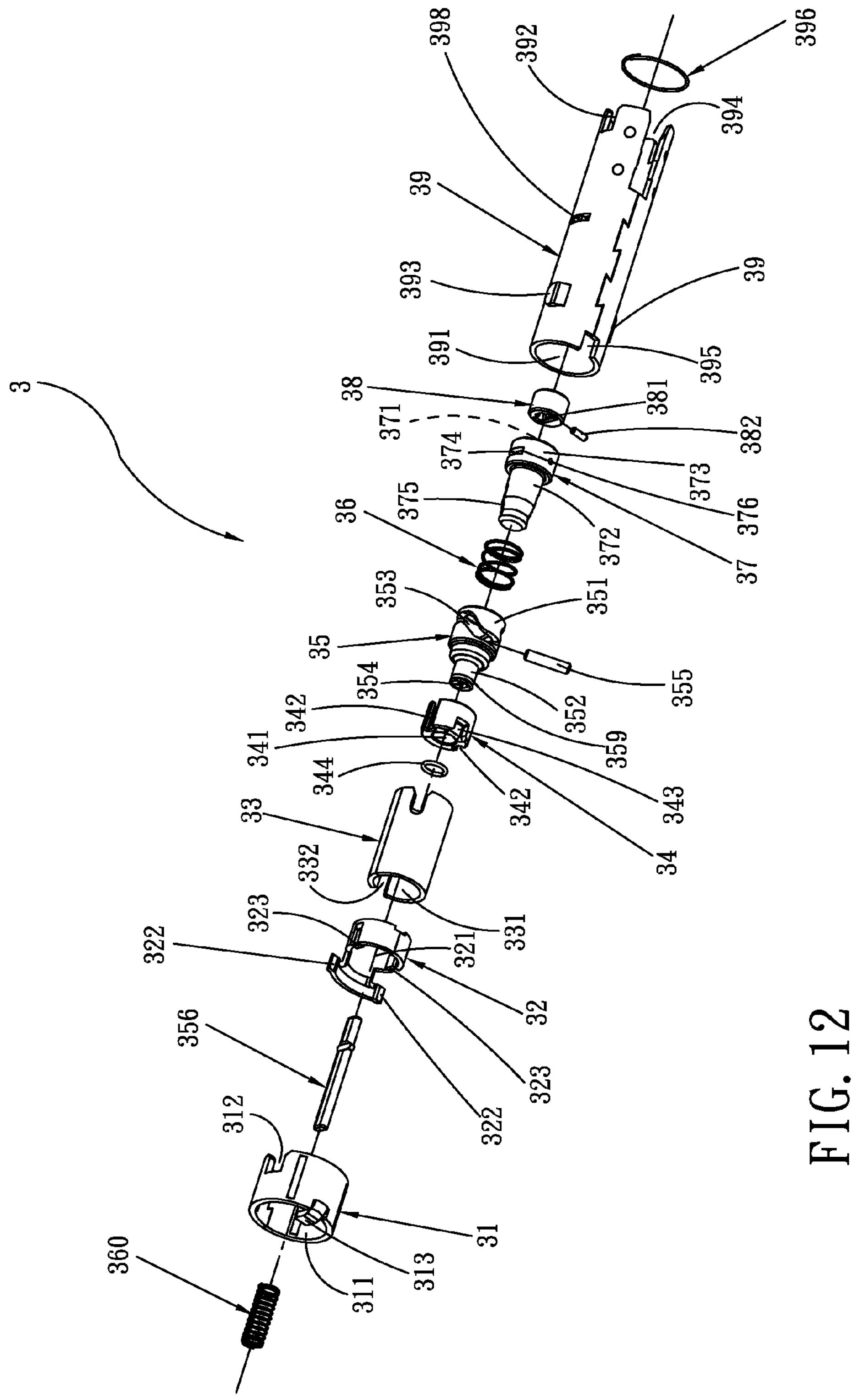
FIG. 12 is a perspective exploded diagram showing the first transmission structure of the second preferred embodiment of the present invention.

As shown in FIG. 11 and FIG. 12, the mentioned first transmission structure 3, includes:

A tube 33 which is a tubular shape element, having a center hole 331, and the tube wall having a long groove 332.

An axial shaft 37 can be installed in the center hole 331 of the tube 33, one side of the axial shaft 37 having a flange 373, the other side having an axle 372, an accommodating space 371 formed in the axis of the flange 373, an arc-shaped groove 374 formed on the flange 373, and two pushable parts 376 set separately around the arc-shaped groove 374 (only one shown in FIG. 11 and FIG. 12).

One end of a rotating part 35 having an axle 352, the other end having a flange 351, a first hole 354 connected to a second hole 358 in the axial direction of the rotating part 35, the axle 372 of the axial shaft 37 able to be placed inside the second hole 358, a spiral groove 353 and a convex part 357 formed separately on the flange 351 of rotating part 35, the convex part 357 able to be inserted into the long groove 332 of the tube 33, and the axle 352 of the rotating part 35 having a retaining ring groove 359.

A pushing part 32 having one side with two separate pushing sections 322, the pushing section 322 able to push the drive base 26 at the appropriate time; at least one convex part 323 formed on the interior side of the tube wall of the pushing part 32.

An engaging element 34 has a hole 341 in the axial direction, which can allow for axle 352 of the rotating part 35 to be set inside, the engaging element 34 partially installed in the center hole 321 of the pushing part 32, a meshing section 343 and two separate grooves 342 formed on the engaging element 34; two separate grooves 342 of the engaging element 34 able to be respectively set on two convex parts 323 of the pushing part 32 so as to maintain an axial motion of the engaging element 34.

A pin 355 can be set through the spiral groove 353 of the rotating part 35 and the through hole 375 of the axial shaft 37.

A spring 36 can be axially set on the axle 372 of the axial shaft 37 so as to partially press the pin 355, the rotating part 35 and the engaging part 34.

A moving part 38 can be placed in the accommodating space 371 of the axial shaft 37, a through hole 381 is formed at the center of the moving part 38 and at least one moving element 382 is formed around the moving part 38 (which can also be connected to the moving part 38 by using a pin 382), the moving element 382 of the moving part 38 able to be inserted into the arc-shaped groove 374 of the axial shaft 37, thereby after making the moving element 382 of the moving part 38 rotate at an angled position in a predetermined direction, the moving element 382 of the moving part 38 is able to push the pushable part 376 of the axial shaft 37 appropriately.

A tubular shaped element 39 has a center hole 391, which accepts the insertion of the tube 33 and partial pushing part 32, a ring 396 set on the exterior tube wall of the tubular shaped element 39 increases the strength, one end of the tubular shaped element 39 having two separate convex parts 393 (only one shown in FIG. 11) and an indentation 395 (only shown in FIG. 12) on the exterior tube wall, the other end having two separate grooves 392 able to mesh with the first handle 71, an installation channel 394 able to mesh with the convex part 723 of the lock set 72 and the first handle 71 (shown in FIG. 10), a positioning plate 398 able to be installed and move in the central tube wall of the tubular shaped element 39, and able to accept a partial pressure from the elastic element 397, which is movable between the position partly extending out of the tube wall and the meshing of the first handle 71 or retracting inside the tube wall and moving away from the first handle 71, and which won't be repeated again here due to its conventional structure.

A collar 31 has a center hole 311, able to be set on the tubular shaped element 39, one end of the collar 31 having a meshing section 313 (only shown in FIG. 12) able to partially mesh with the indentation 395 of the tubular shaped element 39; the other end having two separate notches 312 able to respectively mesh with two convex parts 393 of the tubular shaped element 39 so as to increase the strength and torsional strength of the tubular shaped element 39.

Figure 13:
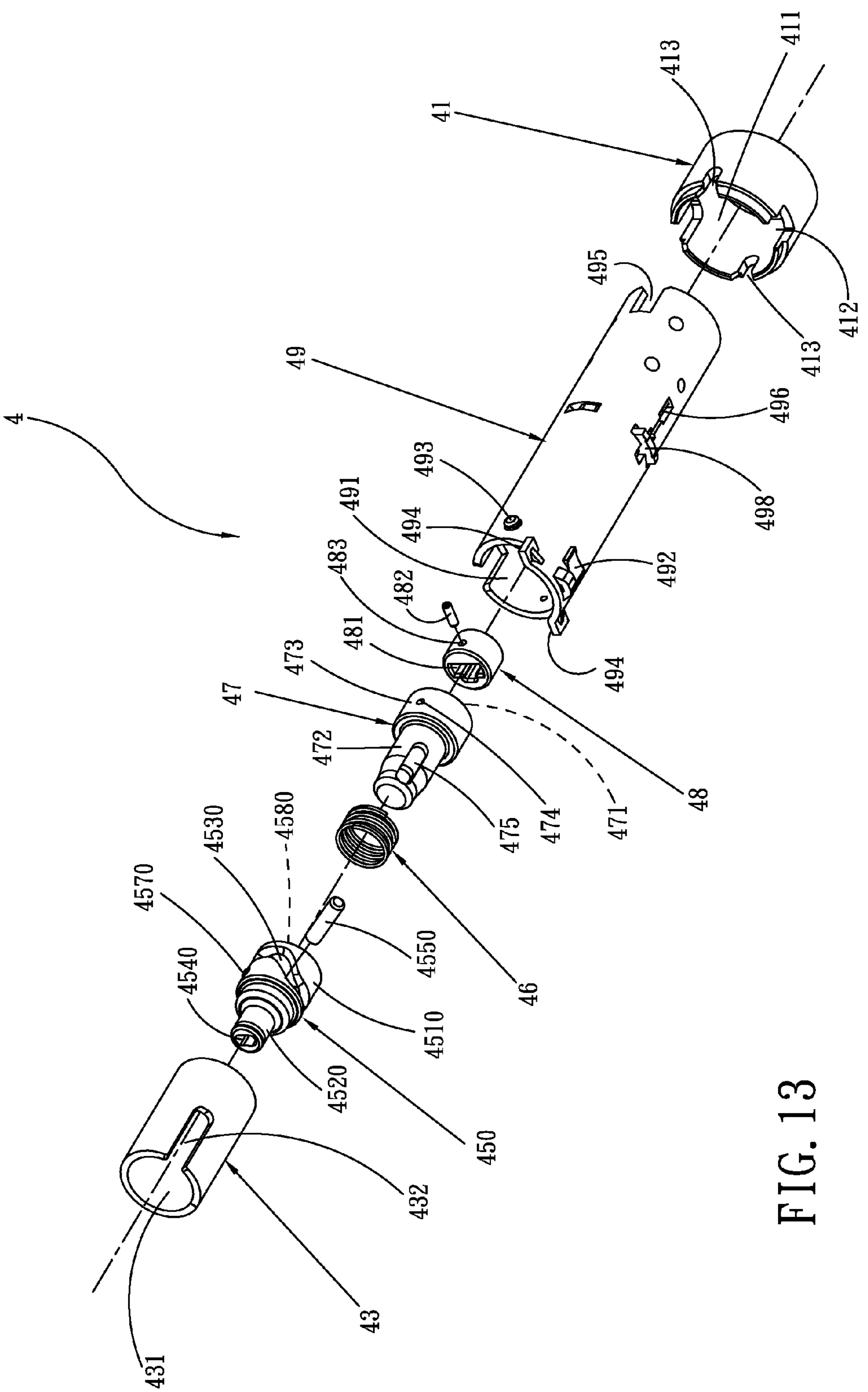
FIG. 13 is a perspective exploded diagram showing the second transmission structure of the second preferred embodiment of the present invention.
Figure 14:
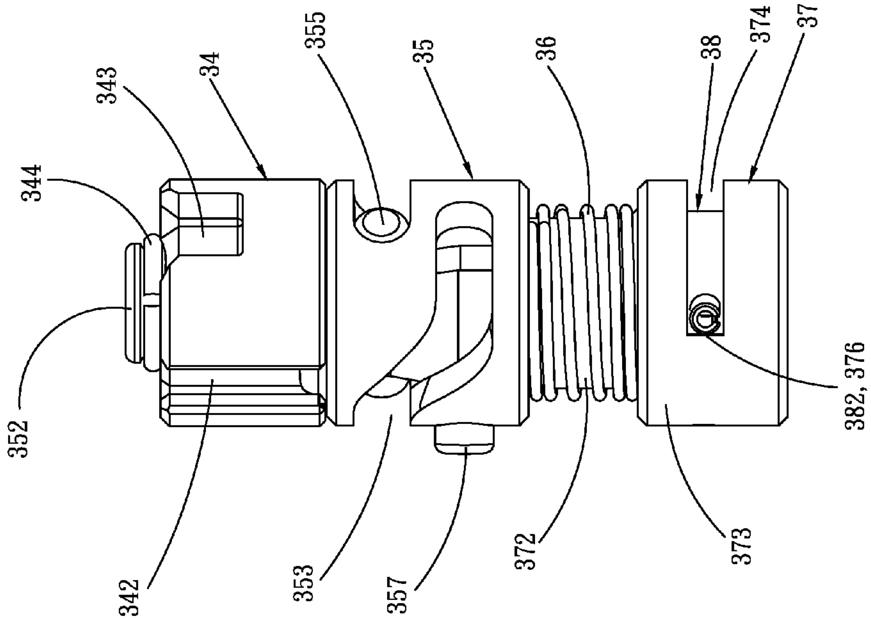
FIG. 14 is a plane diagram showing an engaging part situated at the first position after combining a moving part, an axial shaft, a rotating part, an engaging part, a pin and a spring, of the second preferred embodiment of the present invention.
Figure 15:
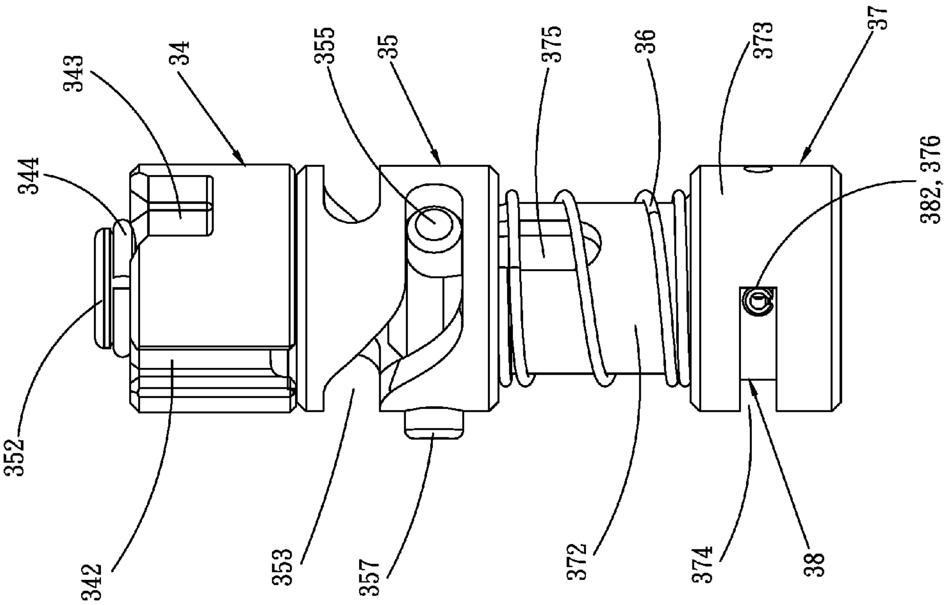
FIG. 15 is a plane diagram showing an engaging part situated at the second position after combining a moving part, an axial shaft, a rotating part, an engaging part, a pin and a spring, of the second preferred embodiment of the present invention.

As shown in FIG. 11 and FIG. 13, the mentioned second transmission structure 4, includes: A driving tube 49 has a center hole 491, one end having two separate pushing sections 494 adjacent to the support part 262 of the drive base 26, able to directly drive the drive base 26, the other end of the driving tube 49 having two separate grooves 495 set at an interval and an installation channel (not shown in the figure), able to mesh with the second handle 81, the driving tube 49 having a projection 492 projecting out from the tube wall and two separate convex parts 493 around the vicinity of the pushing section 494, a positioning plate 498 able to be installed and move in the central tube wall of the driving tube 49, able to accept partial pressure from the elastic element 496, which is movable between the position partly extending out of the tube wall and the meshing of the second handle 81 or retracting inside the tube wall and moving away from the second handle 81, and which won't be repeated again here due to its conventional structure.

A strengthening ring 41 has a center hole 411, able to be set on the driving tube 49, a strengthening ring 41 having a notch 412 and two separate grooves 413, the notch 412 of the strengthening ring 41 able to mesh with the projection 492 of the driving tube 49; two grooves 413 of the strengthening ring 41 able to respectively mesh with the two convex parts 493 of the driving tube 49 so as to increase the strength and the torque of the driving tube 49.

A tube 43 is a tubular shaped element having a center hole 431 and a long groove 432.

An axial shaft 47 can be installed in the center hole 431 of the tube 43, one side of the axial shaft 47 having a flange 473, the other side having an axle 472, an accommodating space 471 formed on the axis of the flange 473, a hole 474 formed on the flange 473, and the transverse direction of axle 472 having a through hole 475.

One end of a rotating part 450 having an axle 4520, the other end having a flange 4510, a first hole 4540 connected to a second hole 4580 in the axial direction of the rotating part 450, the axle 472 of the axial shaft 47 able to be placed inside the second hole 4580, a spiral groove 4530 and a convex part 4570 formed separately on the flange 4510 of a rotating part 450 (only shown in FIG. 13), the convex part 4570 able to be inserted into the long groove 432 of the tube 43.

A pin 4550 can be set through the spiral groove 4530 of the rotating part 450 and the through hole 475 of the axial shaft 47.

A spring 46 can be axially set on the axle 472 of the axial shaft 47 so as to partially press the pin 4550 and the rotating part 450.

A moving part 48 can be placed in the accommodating space 471 of the axial shaft 47 (shown in FIG. 13), a through hole 481 is formed at the center of the moving part 48 and a hole 483 is formed around the moving part 48, a pin 482 is set through the hole 474 of the axial shaft 47 and the hole 483 of the moving part 48 so as to join the two holes together.

One end of a linkage rod 356 can be inserted into the first hole 354 of the rotating part 35 of the first transmission structure 3, and the other end can be inserted into the first hole 4540 of the rotating part 450 of the second transmission structure 4, a spring 360 able to be set on the linkage rod 356 so as to partially press the rotating part 35 of the first transmission structure 3 and the rotating part 450 of the second transmission structure 4.

As shown in FIG. 10 and FIG. 11, the housing 2 is formed by connecting a base 23, a first cover plate 24, a second cover plate 25, a sleeve 21 and a cylindrical housing 22.

A sleeve 21 is a hollow tubular shape and has a center hole 211 which can allow tubular shaped element 39 to pass through, one end having a flange 212, the flange 212 having two separate notches 213 and four separate holes 214, the holes 214 allowing the hook 232 of the base 23 to pass through, thereafter bending the hook 232, and able to fix the sleeve 21 on one side of the base 23.

A cylindrical housing 22 is a tubular shape, one end having an opening 225, the other end having a bottom 226 set horizontally, the bottom 226 connected to a cylinder 224, a center hole 221 formed on the cylinder 224, and the bottom 226 having four separate holes 222 set at intervals (only two shown in the figure) and two separate through holes 223 (only one shown in the figure), the center hole 221 able to allow driving tube 49 to pass through, the cylindrical housing 22 able to be directly set on the base 23 so as to let the hook 232 of the base 23 pass through the hole 222 of the cylindrical housing 22, thereafter bending the hook 232, and fixing the cylindrical housing 22 on the other side of the base 23, at this moment, each of the through holes 223 are able to respectively match each pillar 51 of the first cover plate set 5, and are connected to each other by using screws (not shown in the figure).

As shown in FIG. 10, FIG. 11, FIG. 16 and FIG. 17, the lock set 82 of the second handle set 8 and the lock set 72 of the first handle set 7 can control the unlocking or locking operation. On the inside side of the lock, simply turning the second handle 81 to drive the pushing section 494 of the driving tube 49 to move the drive base 26, the door can be opened; however, the pre-set locked status or unlocked status of the lock will not be changed.

As shown in FIG. 10, FIG. 11, FIG. 16 and FIG. 17, when trying to operate the lock to be locked from the lock set 82 of the second handle set 8 by using the correct key (not shown in the figure), to rotate the lock core 821 to move from the beginning position at an angled position about 360 degrees in a predetermined direction back to the beginning position. At this moment, the transmission part 822 of the lock set 82 will push the moving part 48, thereby the moving part 48 can directly rotate the axial shaft 47.

Because two spiral grooves 4530 of the rotating part 450 match the through holes 475 of the axial shaft 47 and a pin 4550 connects them, when the axial shaft 47 rotates, the rotating part 450 will move corresponding to the axial displacement distance generated by axial shaft 47, until the rotating part 450 cannot be further axially displaced, the rotating part 450 then starts to rotate. Therefore the linkage rod 356 rotates and moves the rotating part 35 of the first transmission structure 3 to generate an axial displacement.

Figure 16:
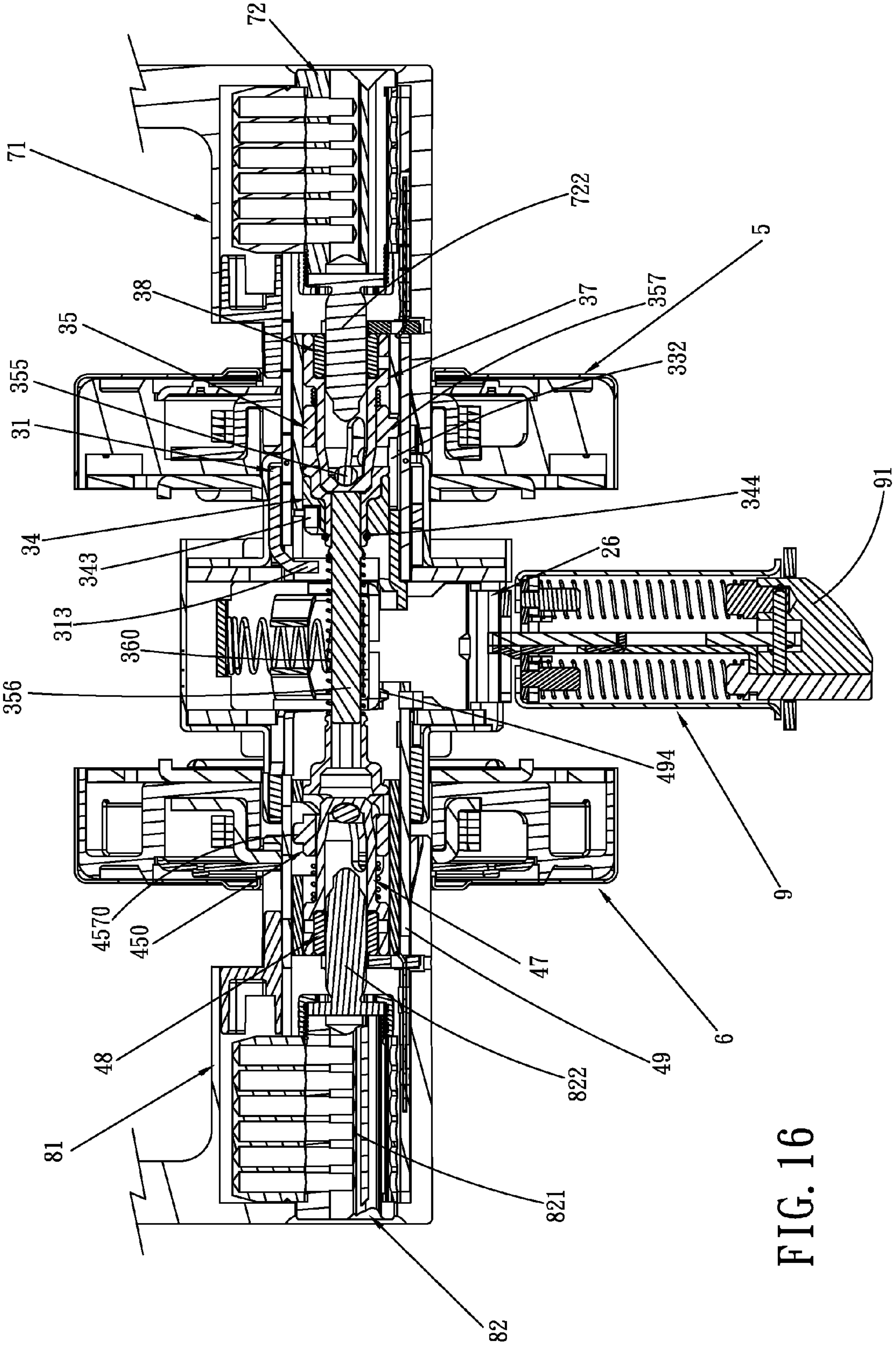
FIG. 16 is a sectional diagram showing the meshing section of the engaging element and the meshing section of the collar to be positioned on the incompatible meshing of the first position in the overall lock structure of the second preferred embodiment of the present invention.
Figure 17:
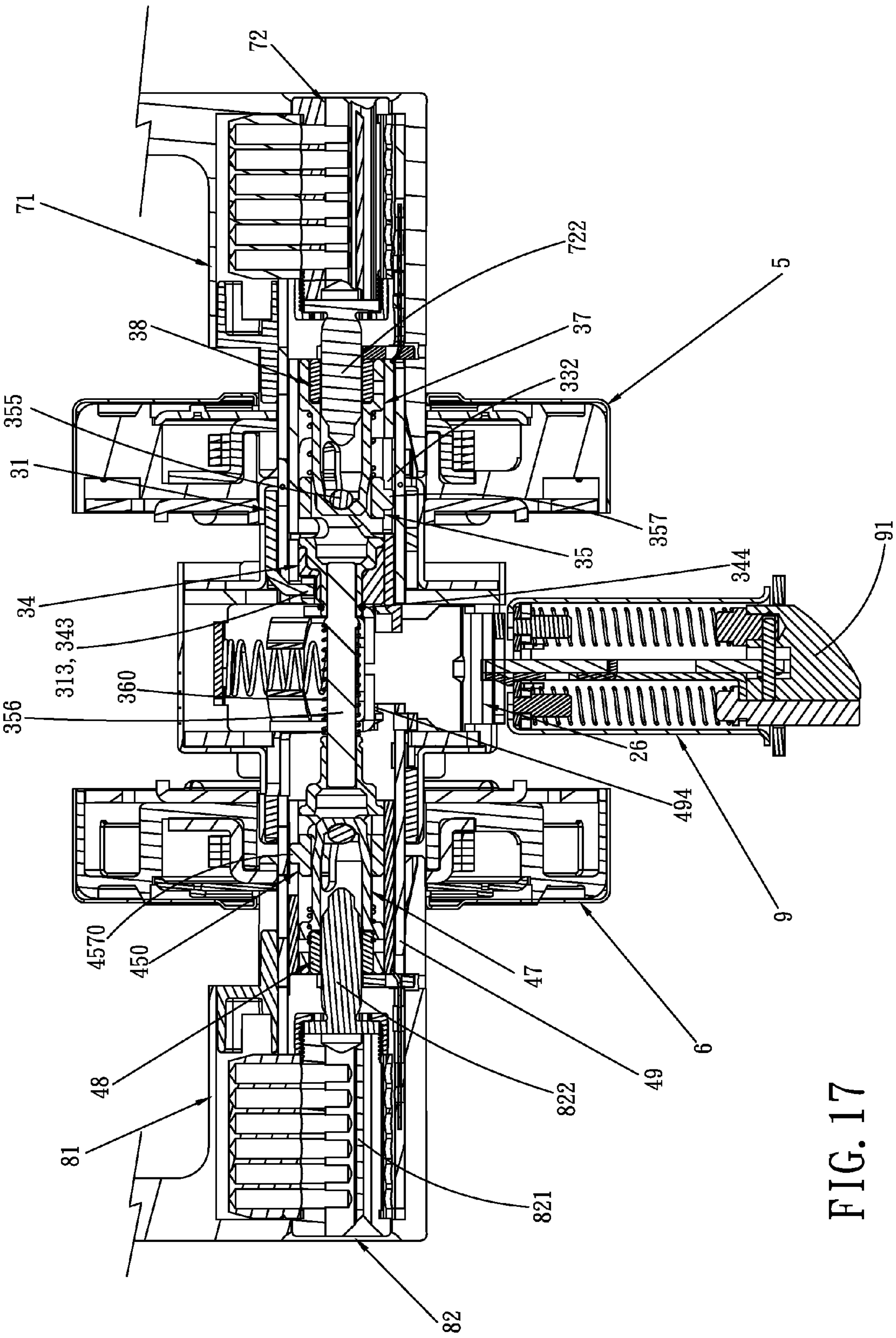
FIG. 17 is a sectional diagram showing the meshing section of the engaging element and the meshing section of the collar to be positioned on the meshing of the second position in the overall lock structure of the second preferred embodiment of the present invention.

Thus, the retaining ring groove 359 of the rotating part 35 will move the engaging element 34 to do axial displacement, causing the meshing section 343 of the engaging element 34 to move from the meshed second position of the meshing section 313 of the collar 31 (as shown in FIG. 17) to the disengaged first position of the meshing section 313 of the collar 31 (as shown in FIG. 16). Therefore, rotating the first handle 71 will link to, and move the tubular shaped element 39 to rotate idly at a predetermined angle and the pushing part 32 cannot be moved, resulting in an external locked status.

As shown in FIG. 10, FIG. 11, FIG. 16 and FIG. 17, when trying to operate the lock to be unlocked from the lock set 82 of the second handle set 8, it is necessary to use the correct key (not shown in the figure) at the lock interior to operate the lock set 82, and to rotate the lock core 821 to move from the beginning position at an angled position about 360 degrees in a predetermined direction back to the beginning position.

At this moment, the transmission part 822 of the lock set 82 will operate opposite to the directional procedures as the above mentioned.

The transmission part 822 of the lock set 82 will push the moving part 48, thereby the moving part 48 can directly rotate the axial shaft 47.

Because two spiral grooves 4530 of the rotating part 450 match the through holes 475 of the axial shaft 47 and a pin 4550 connects them, when the axial shaft 47 rotates, the rotating part 450 will move corresponding to the axial displacement distance generated by axial shaft 47, until the rotating part 450 cannot be axially displaced further, the rotating part 450 then starts to rotate. Therefore the linkage rod 356 rotates and moves the rotating part 35 of the first transmission structure 3 to generate an axial displacement, then rotating part 35 pushes engaging element 34 to be axially displaced, causing the meshing section 343 of the engaging element 34 to move from the disengaged first position of the meshing section 313 of the collar 31 (as shown in FIG. 16) to the meshing second position of the meshing section 313 of the collar 31 (as shown in FIG. 17).

Therefore, when rotating the first handle 71, it links to, and moves the tubular shaped element 39 and the collar 31, because the meshing section 313 of the collar 31 meshes with the meshing section 343 of the engaging element 34, and the groove 342 of the engaging element 34 is set on the convex part 323 of the pushing part 32 thereby moving the pushing section 322 of the pushing part 32 to drive the support part 262 of the drive base 26, and therefore causing the drive base 26 to pull the interior driving element of the latch mechanism 9 to retract the latch bolt 91, thereby allowing for the door to be opened.

When trying to open the door from the exterior lock in a locked status, the correct key (not shown in the figure) is needed to operate the lock set 72 of the first handle set 7 to rotate the lock core 721 to move from the beginning position at an angled position about 360 degrees in a predetermined direction back to the beginning position. At this moment, the transmission part 722 of the lock set 72 will push the moving part 38 to rotate idly at an angle, because in normal mode, the moving element 382 of the moving part 38 will be situated at the middle position of the arc-shaped groove 374 of the axial shaft 37, which causes the moving element 382 of the moving part 38 to push the pushable part 376 of the axial shaft 37 so as to rotate the axial shaft 37.

Because two spiral grooves 353 of the rotating part 35 match the through holes 375 of the axial shaft 37 and a pin 355 connects them, when the axial shaft 37 rotates, the rotating part 35 will move corresponding to the axial displacement distance generated by axial shaft 37, thereby pushing the engaging element 34 to do axial displacement, causing the meshing section 343 of the engaging element 34 to move from the disengaged first position of the meshing section 313 of the collar 31 (as shown in FIG. 16) to the meshing second position of the meshing section 313 of the collar 31 (as shown in FIG. 17).

Therefore, when rotating the first handle 71, it links to, and moves the tubular shaped element 39 and the collar 31, because the meshing section 313 of the collar 31 meshes with the meshing section 343 of the engaging element 34, and the groove 342 of the engaging element 34 is set on the convex part 323 of the pushing part 32, thereby moving the pushing section 322 of the pushing part 32 to drive the support part 262 of the drive base 26, causes the drive base 26 to pull the interior driving element of the latch mechanism 9 to retract the latch bolt 91, thereby allowing for the door to be opened.

When trying to do the locking operation by using the lock set 72 of the first handle set 7, just operate opposite to the directions of the above mentioned operation, which won't be repeated again.

Figure 18:
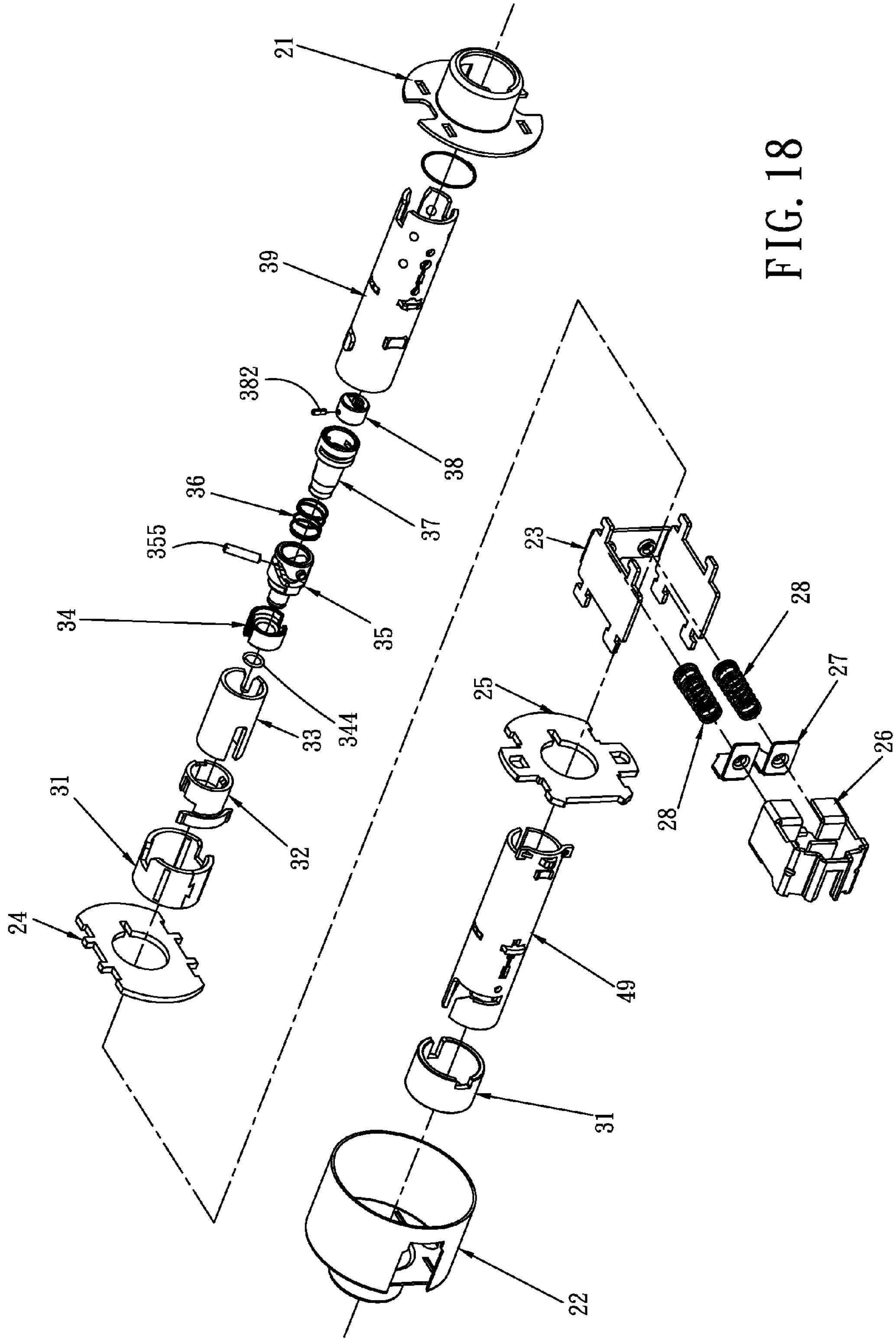
FIG. 18 is a perspective exploded diagram showing every components of the lock transmission structure of the second preferred embodiment of the present invention.
Figure 19:
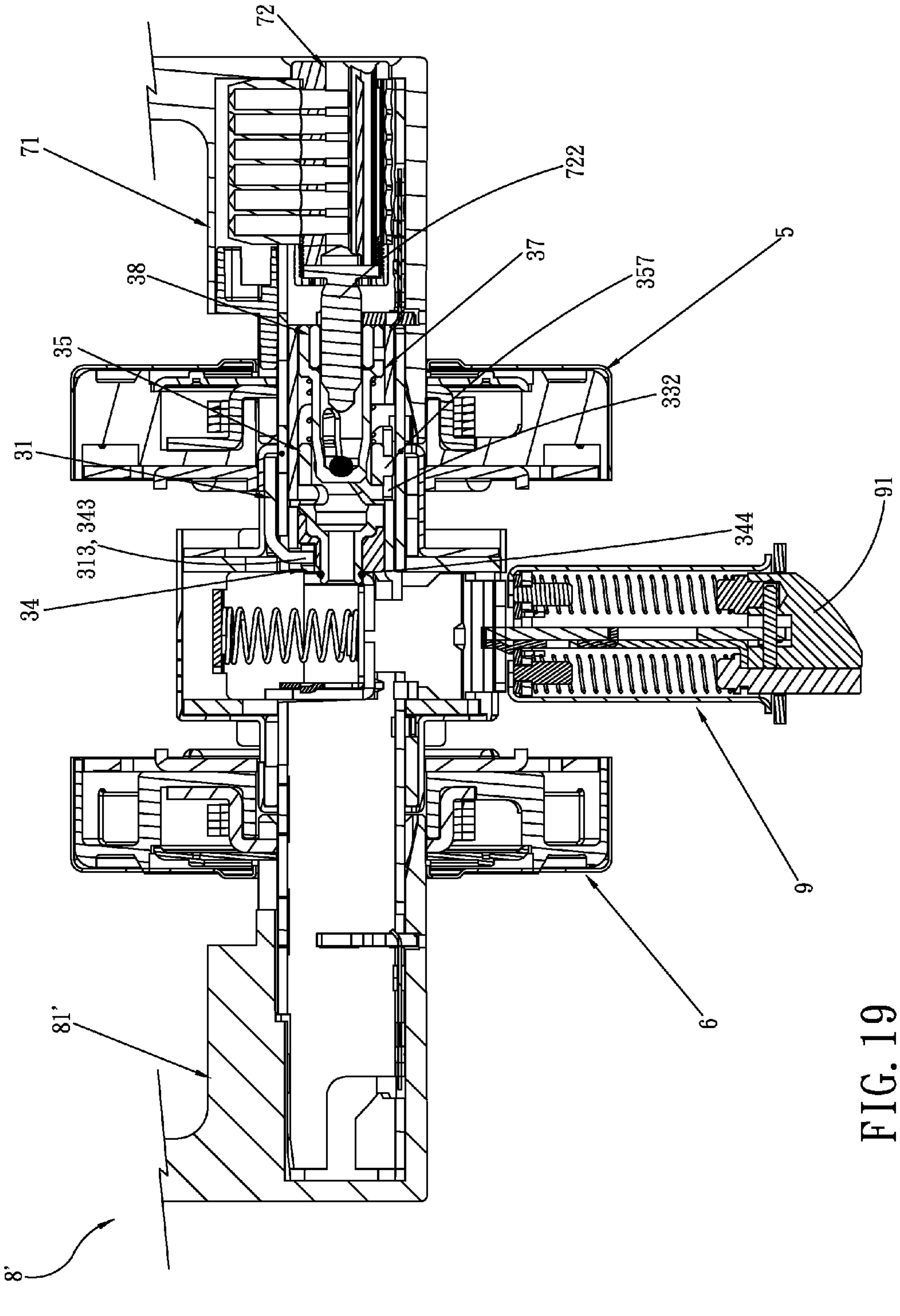
FIG. 19 is a sectional diagram showing the meshing section of the engaging element and the meshing section of the collar to be positioned on the compatible meshing position in the overall lock structure of the second preferred embodiment of the present invention.

An additional embodiment of the above, is that the first handle set 7 and the second handle set 8 respectively have the function of the lock set 72 and lock set 82, which also can be converted into another embodiment as shown in FIG. 18 and FIG. 19. Only the first handle set 7 has the function of the lock set 72 and the second handle set 8' has no lock set, at this time the second handle 81' of the second handle set 8' should be converted into an installation hole with no lock set and the lock set 82 should be removed, and the moving part 48, the axial shaft 47, the spring 46, the rotating part 450, the pin 4550, the tube 43, the linkage rod 356 and the spring 360 etc. relative to the second transmission structure 4 should be removed, thereafter the cylindrical lock only having the function of a single-side lock set is formed.

Many changes and modifications in the above described embodiment of the invention can, of course, be carried out without departing from the scope thereof Accordingly, to promote the progress in science and the useful arts, the invention is disclosed and is intended to be limited only by the scope of the appended claims.

What is claimed is:

1. A transmission structure of a cylindrical lock installed on a door, comprising:

- a tubular shaped element coupled to a handle for actuation;
- a tube in the tubular shaped element;
- a pushing part having a hollow portion and a side with at least one pushing section, the at least one pushing section able to push a drive base at an appropriate time;
- a collar able to be set on an end of the tubular shaped element, one meshing section formed on the collar;
- an engaging element partly installed in the pushing part, the engaging element being received and axially movable within the hollow portion of the pushing part, another meshing section formed on the engaging element, and the engaging element having at least one pushable section; and
- a lock set having a lock core linked to a transmission part; rotating the lock core to operate the transmission part of the lock set to push a moving part, causing the engaging element to do axial displacement, and causing the meshing section of the engaging element to move between a first position, where the meshing section of the engaging element disengages the meshing section of the collar, and a second position, where the meshing section of the engaging element engages the meshing section of the collar.

2. The transmission structure of the cylindrical lock of claim 1, wherein the transmission structure further comprises a rotating part, the rotating part having at least one pushing portion, the at least one pushing portion at an appropriate time pushing the at least one pushable section of the engaging element.

3. The transmission structure of the cylindrical lock of claim 2, wherein the engaging element has a hole, the rotating part having an axle, the axle of the rotating part able to be inserted through the hole of the engaging element.

4. The transmission structure of the cylindrical lock of claim 3, wherein the rotating part further has a circlip, the axle having a retaining ring groove; the circlip able to fasten to the retaining ring groove.

5. The transmission structure of the cylindrical lock of claim 1, wherein the collar has a notch, the tubular shaped element having a convex part and an indentation, the notch of the collar connected to the convex part of the tubular shaped element, the meshing section of the collar and the indentation of the tubular shaped element meshing with each other.

6. The transmission structure of the cylindrical lock of claim 1, wherein the collar and the tubular shaped element can be integrally-formed.

7. The transmission structure of the cylindrical lock of claim 1, further comprising: at least one convex part formed on the pushing part; at least one groove formed on the engaging element, and the at least one groove of the engaging element able to be set respectively on the at least one convex part of the pushing part.

8. The transmission structure of the cylindrical lock of claim 1, further comprising: an axial shaft installed in the tube, having one side with at least one pushable part; the moving part having at least one moving element, the at least one moving element of the moving part able to timely push the at least one pushable part of the axial shaft.

9. The transmission structure of the cylindrical lock of claim 2, wherein the tube has a long groove, the rotating part has a convex part, the long groove of the tube being configured to accommodate a convex part of the rotating part.

10. The transmission structure of the cylindrical lock of claim 9, wherein the tube has an accommodating groove, the accommodating groove being configured to accommodate the convex part of the rotating part.

11. The transmission structure of the cylindrical lock of claim 10, wherein the accommodating groove of the tube has a transverse side and a chamfer.

12. A transmission structure of a cylindrical lock installed on a door, comprising:

- a tubular shaped element coupled to a handle for actuation;
- a tube in the tubular shaped element;
- a pushing part having a hollow portion and a side with at least one pushing section, the pushing section able to push a drive base; at least one convex part formed on the pushing part;
- a collar able to be set on the tubular shaped element, one meshing section formed on the collar;

an axial shaft installed in the tube, having a side with at least one pushable part, a transverse side of the axial shaft having a through hole;

a rotating part installed in the tube, a tube wall of the rotating part having at least one spiral groove, the rotating part having at least one pushing portion;

the rotating part able to be partly placed inside an engaging element installed in the pushing part, having another meshing section and at least one groove formed on the engaging element, the engaging element being received and axially movable within the hollow portion of the pushing part, the at least one groove of the engaging element able to be set on at least one convex part of the pushing part so as to maintain an axial motion of the engaging element, and the engaging element having at least one pushable section;

a pin able to be installed and move in a through hole of the axial shaft and a spiral groove of the rotating part;

a spring set on the axial shaft, able to partly press the rotating part and the engaging element; and a lock set having a lock core linked to a transmission part; rotating the lock core to Operate the transmission part of the lock set to push a moving part, causing the engaging element to do axial displacement, and causing the meshing section of the engaging element to move between a first position, where the meshing section of the engaging element disengages the meshing section of the collar, and a second position, where the meshing section of the engaging element engages the meshing section of the collar.

13. A transmission structure of a cylindrical lock installed on a door, the transmission structure capable of operating a drive base, the drive base able to link to and actuate a latch mechanism, the transmission structure comprising:

a tubular shaped element coupled to a handle for actuation;

a pushing part having a hollow portion and a side with at least one pushing section, the at least one pushing section able to push the drive base at an appropriate time; at least one convex part formed on the pushing part;

a collar able to be set on an end of the tubular shaped element, one meshing section formed on the collar;

an engaging element partly installed in the pushing part, the engaging element being received and axially movable within the hollow portion of the pushing part, another meshing section and at least one groove formed on the engaging element, and the at least one groove of the engaging element able to be set on the at least one convex part of the pushing part so as to maintain an axial motion of the engaging element, and the engaging element having at least one pushable section;

a rotating part having at least one pushing portion, the at least one pushing portions appropriately pushing the at least one pushable section of the engaging element; and a lock set having a lock core linked to a transmission part; rotating the lock core to move from a beginning position at an angled position in a predetermined direction, the transmission part of the lock set pushing a moving part, causing the engaging element to do axial displacement, and causing the meshing section of the engaging element to move between a first position, where the meshing section of the engaging element disengages the meshing section of the collar, and a second position, where the meshing section of the engaging element engages the meshing section of the collar.

* * * * *